(12) United States Patent
Parodi

(10) Patent No.: US 11,493,628 B1
(45) Date of Patent: Nov. 8, 2022

(54) USING PERPENDICULAR ONE-DIMENSIONAL ARRAYS FOR SAFE OPERATION OF AERIAL VEHICLES

(71) Applicant: Amazon Technologies, Inc., Seattle, WA (US)

(72) Inventor: Carlos Parodi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 818 days.

(21) Appl. No.: 16/174,037

(22) Filed: Oct. 29, 2018

(51) Int. Cl.
*G01S 15/93* (2020.01)
*B64C 39/02* (2006.01)
*G01S 15/00* (2020.01)
*G01S 15/89* (2006.01)

(52) U.S. Cl.
CPC .......... *G01S 15/93* (2013.01); *B64C 39/024* (2013.01); *G01S 15/003* (2013.01); *B64C 2201/027* (2013.01); *B64C 2201/141* (2013.01); *G01S 15/89* (2013.01)

(58) Field of Classification Search
CPC ........ G01S 15/93; G01S 15/003; G01S 15/89; B64C 39/024; B64C 2201/141; B64C 2201/027
See application file for complete search history.

(56) References Cited

U.S. PATENT DOCUMENTS

| | | | | |
|---|---|---|---|---|
| 2,470,114 A | * | 5/1949 | Sherwood | G01S 1/72 367/127 |
| 6,434,085 B1 | | 8/2002 | Nedwell | |
| 10,891,868 B1 | * | 1/2021 | Parodi | G08G 5/0039 |
| 2010/0067330 A1 | * | 3/2010 | Collier | G01S 15/42 367/88 |
| 2015/0071031 A1 | * | 3/2015 | Siedenburg | G01S 7/5208 367/11 |

FOREIGN PATENT DOCUMENTS

| | | | | |
|---|---|---|---|---|
| CN | 108267745 A | * | 7/2018 | G01S 15/89 |
| WO | WO-2017219470 A1 | * | 12/2017 | G01S 15/89 |
| WO | WO-2017219471 A1 | * | 12/2017 | G01S 15/89 |

OTHER PUBLICATIONS

WO2017219470-A1 Translation (Year: 2017).*

(Continued)

*Primary Examiner* — Daniel Pihulic

(74) *Attorney, Agent, or Firm* — Athorus, PLLC

(57) ABSTRACT

Aerial vehicles including one-dimensional arrays of transmitters and receivers aligned perpendicular to one another are configured for safe operation. The transmitters may be configured to transmit signals at designated times in order to generate synthetic waves having common fronts from selected angles. The receivers are configured to capture data regarding reflections of the synthetic waves from objects, and to interpret the data to determine bearings or angles to such objects. Locations of the objects may be determined based on angles at which the synthetic waves are transmitted and bearings or angles to the objects that reflected the synthetic waves, as well as times at which reflections of the synthetic waves are received. Maps or other representations of objects on a scene may be generated based on such locations.

20 Claims, 17 Drawing Sheets

(56) References Cited

OTHER PUBLICATIONS https://web.archive.org/web/20180826135822/https://en.wikipedia.org/wiki/Phased_array (Year: 2018).* https://web.archive.org/web/20170720203239/https://en.wikipedia.org/wiki/Phased_array_ultrasonics (Year: 2017).*

Browne, Jack, "Pulsed vs. CW Signals: Both Loom on a Designer's Radar," Microwaves & RF, Jun. 14, 2018, downloaded Apr. 17, 2021 from URL: https://www.mwrf.com/technologies/systems/article/21849213/pulsed-vs-cw-signals-both-loom-on-a-designers-radar, 7 pages.

Wikipedia, "Cross-correlation," Wikipedia, Dec. 5, 2020, downloaded Apr. 5, 2021 from URL: https://en.wikipedia.org/wiki/Cross-correlation, 7 pages.

* cited by examiner

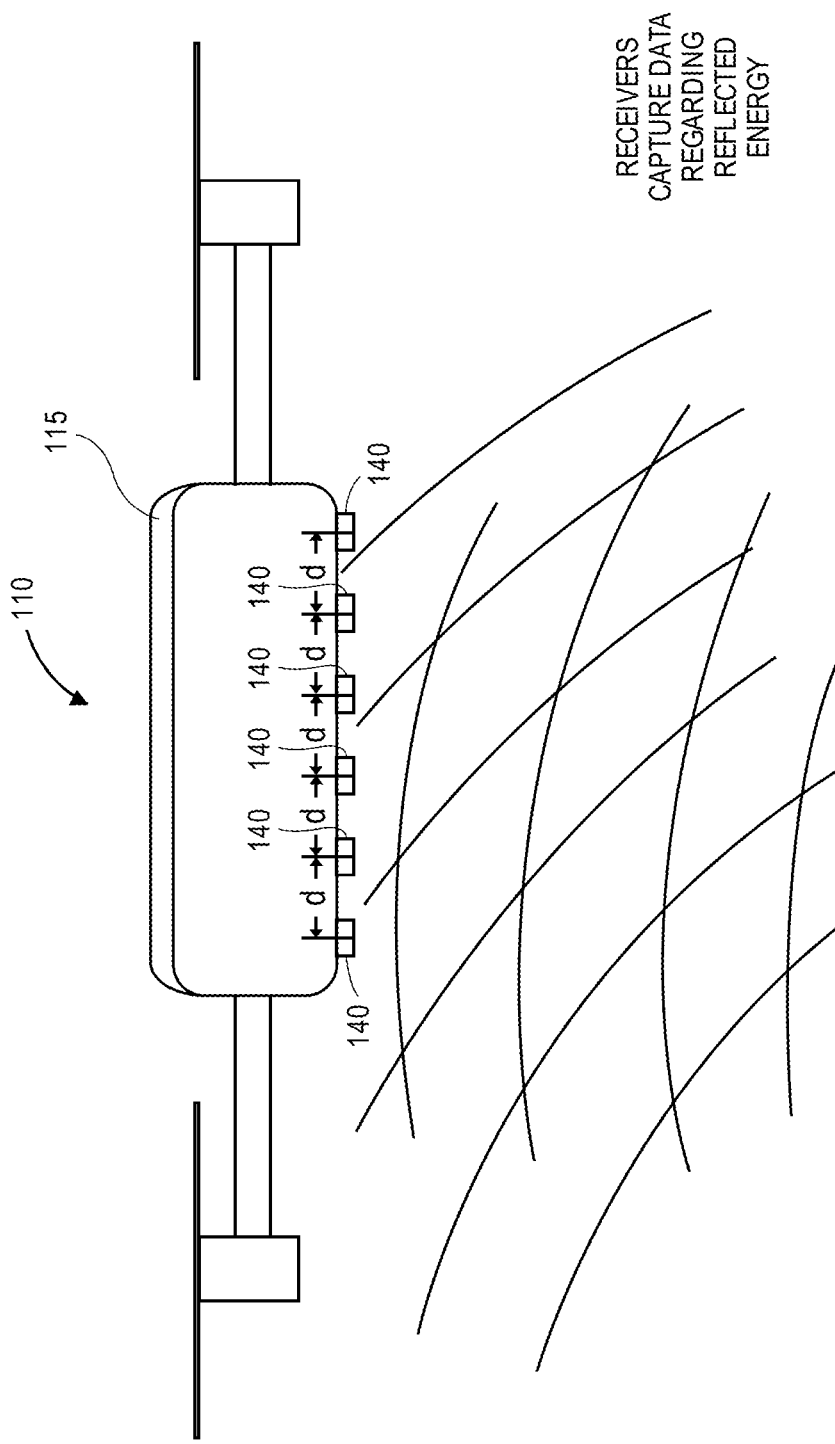

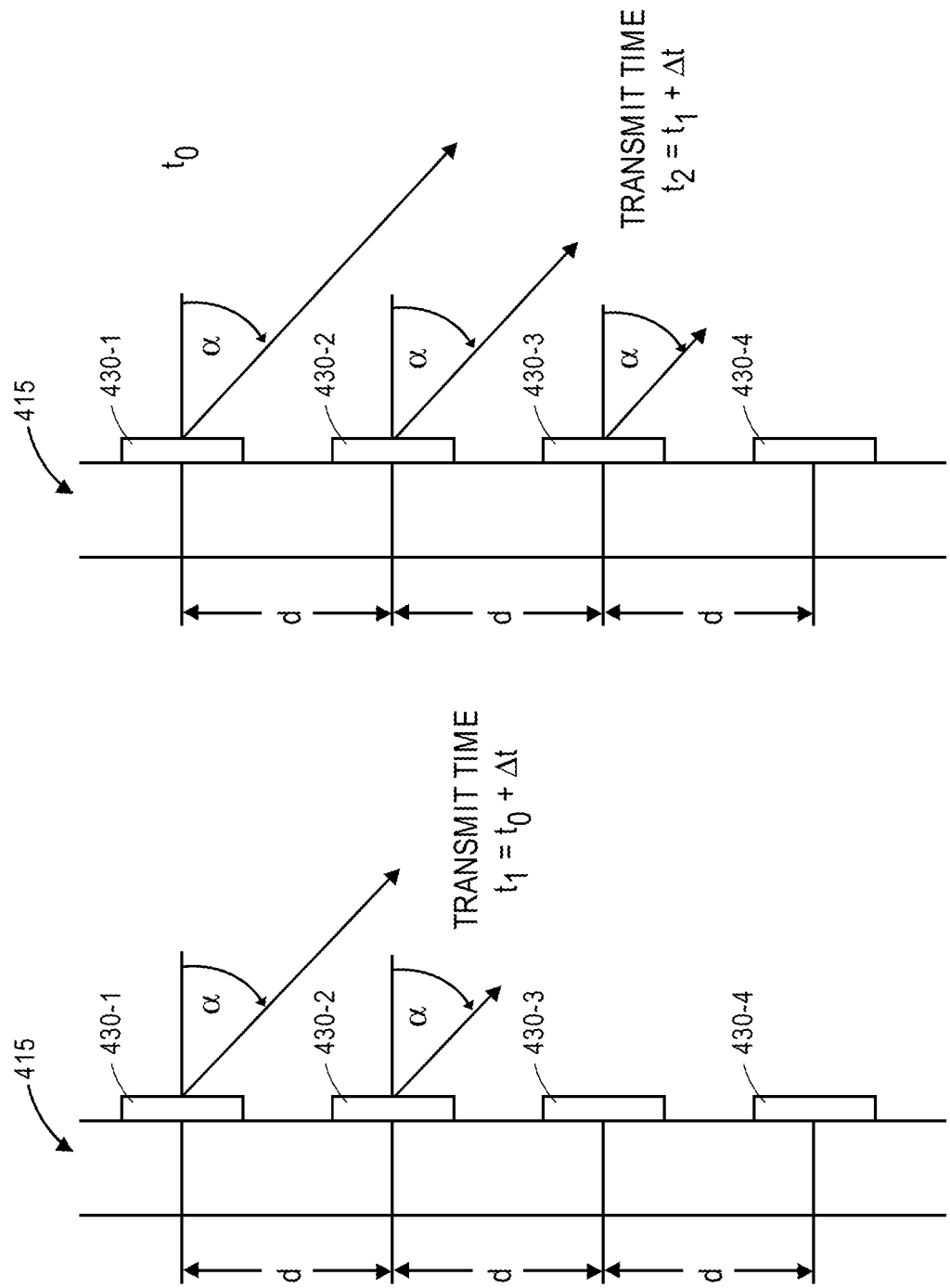

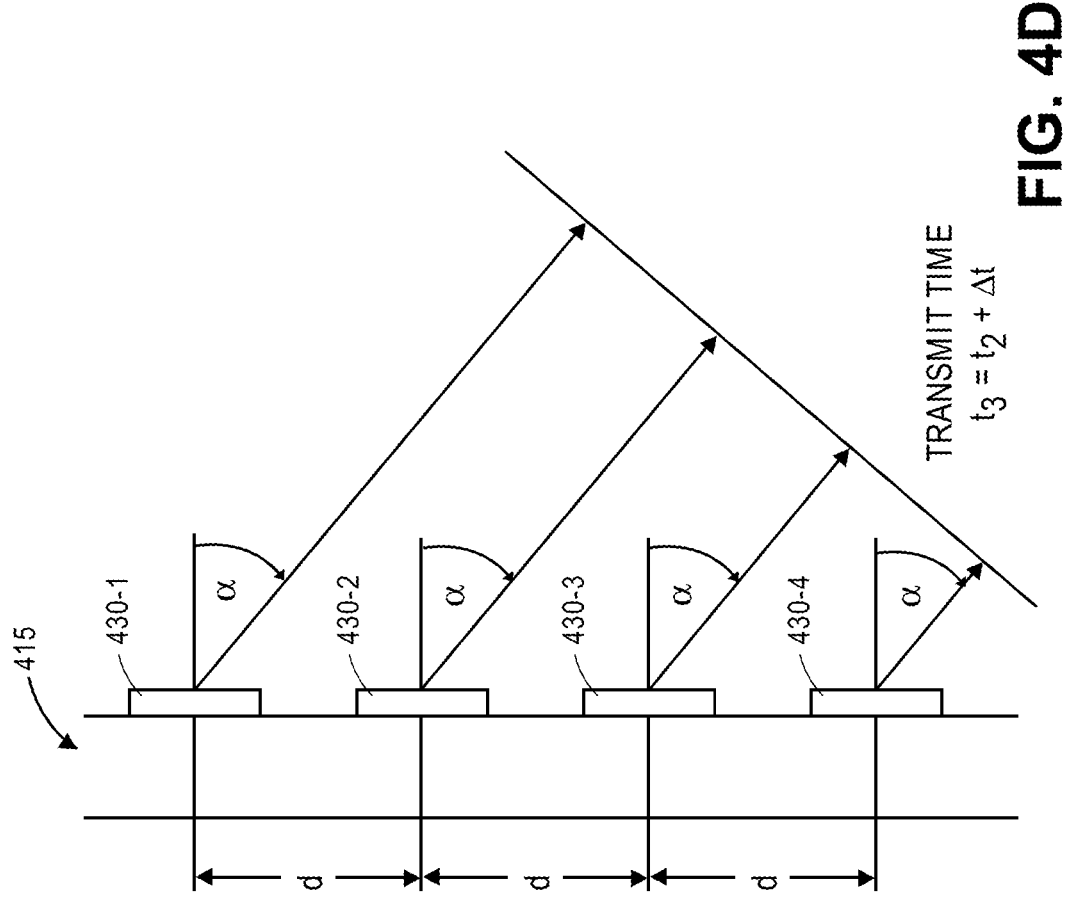

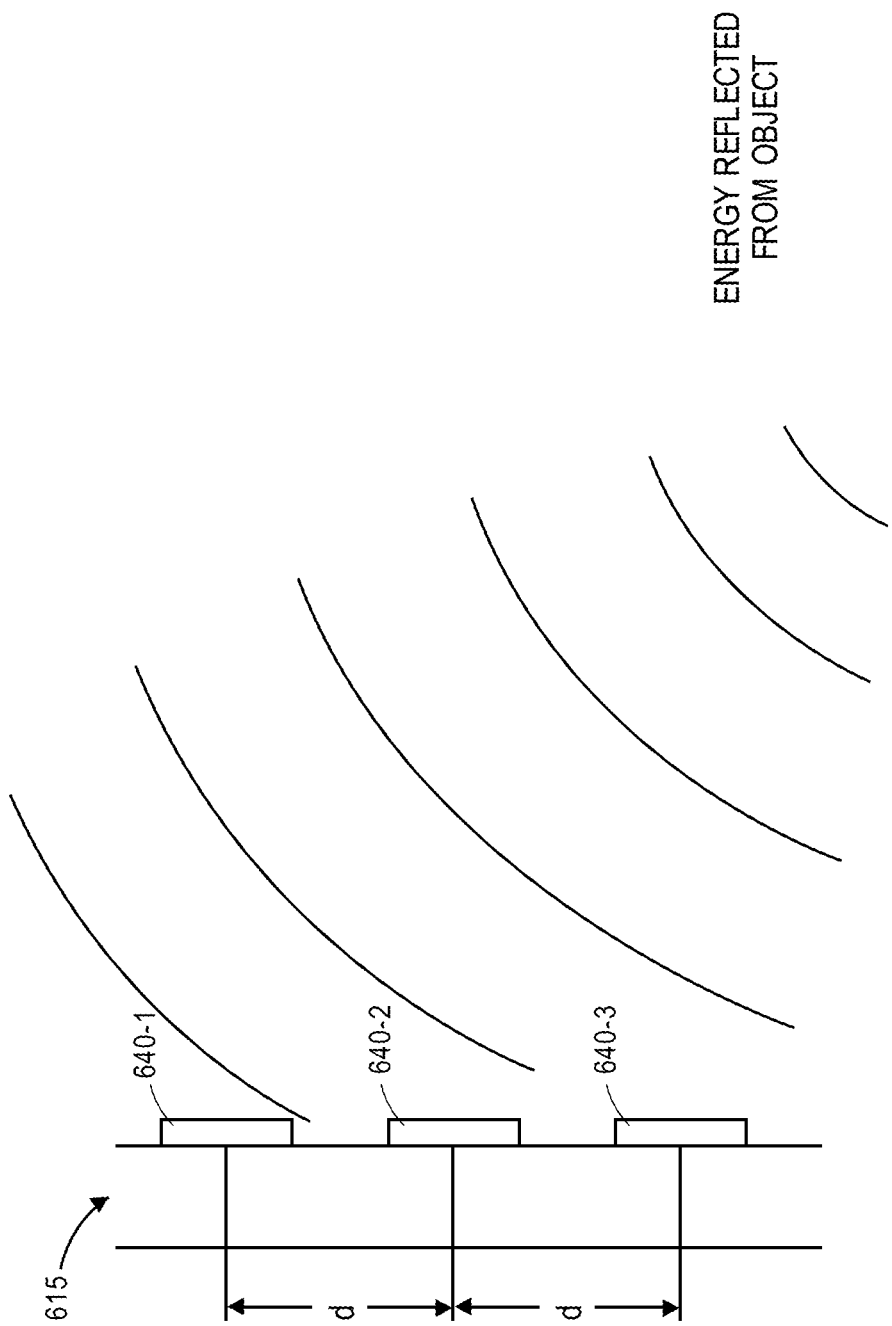

USING PERPENDICULAR ONE-DIMENSIONAL ARRAYS FOR SAFE OPERATION OF AERIAL VEHICLES

BACKGROUND

Synthetic aperture systems (e.g., radar or sonar systems) utilize arrays of omnidirectional transmitters and receivers to operate as single-directional transmitters and receivers by adjusting times at which electromagnetic or acoustic signals are transmitted by the transmitters, and manipulating data regarding energy received by the receivers.

Using synthetic aperture techniques, a single transmitter may be operated to transmit one or more pulses of energy in multiple directions. A two-dimensional array of receivers in a square, n×n configuration may be manipulated to capture reflections (e.g., echoes) of the pulsed energy from multiple directions, and to dynamically adjust data captured by the receivers in order to determine whether reflections originated from any number of selected directions, effectively using the receivers of the two-dimensional array and the data captured thereby to scan for any number of objects from which the pulsed energy may have been reflected. A position of an object may be determined based on an angle at which signals are transmitted, bearings or angles from which reflections of such signals are received, and times at which such signals were transmitted and received.

While synthetic aperture systems are effective, such systems are also expensive and complex. For example, a two-dimensional receiving array of receiving elements in an n×n configuration necessarily includes n-squared, or $n^2$, receiving elements, along with at least one transmitting elements. For these reasons, the use of synthetic aperture arrays, particularly aboard operating vehicles (e.g., aerial or land-based vehicles), is currently limited.

BRIEF DESCRIPTION OF THE DRAWINGS

FIGS. 1A through 1F are views of aspects of one system for using one-dimensional arrays in accordance with embodiments of the present disclosure.

FIGS. 4A through 4D are views of aspects of one system for using one-dimensional arrays in accordance with embodiments of the present disclosure.

FIGS. 6A through 6D are views of aspects of one system for using one-dimensional arrays in accordance with embodiments of the present disclosure.

DETAILED DESCRIPTION

As is set forth in greater detail below, the present disclosure is directed to the use of pairs of one-dimensional arrays in synthetic aperture applications, e.g., sonar or radar applications. In accordance with embodiments of the present disclosure, one-dimensional arrays of transmitters and receivers may be aligned along lines that are perpendicular to one another. Electromagnetic and/or acoustic signals may be transmitted by a one-dimensional array of transmitters at selected angles of interest and at selected times in order to generate synthetic waves of signals in directions of the angles of interest that originate from the one-dimensional array. Times at which the signals are transmitted may be selected based on the angles of interest, as well as the construction of the transmitter array. Additionally, energy captured by each of the respective receivers may be processed to determine bearings or angles and distances to objects from which the energy was received. For example, upon recognizing differences in times at which intensities of energies were captured by various receivers, angles corresponding to such differences may be determined. Distances to objects may be determined based on angles at which the synthetic waves were transmitted by the transmitting array, and angles from which energies were captured by the receiving array, as well as times at which the energies were captured by the receiving array. A representation of positions of such objects may be generated based on the bearings or angles and times accordingly.

The use of a one-dimensional array of transmitters (e.g., a 1×n array or an n×1 array) aligned along a line that is perpendicular to a line along which a one-dimensional array of receivers (e.g., an n×1 array or a 1×n array) is aligned may provide the advantages of synthetic aperture systems at a lower cost and with greater simplicity, particularly in applications where the one-dimensional arrays are mounted to operating vehicles, such as aerial vehicles or autonomous ground vehicles, or to other systems having reduced sizes or surface areas.

Figure 1A:
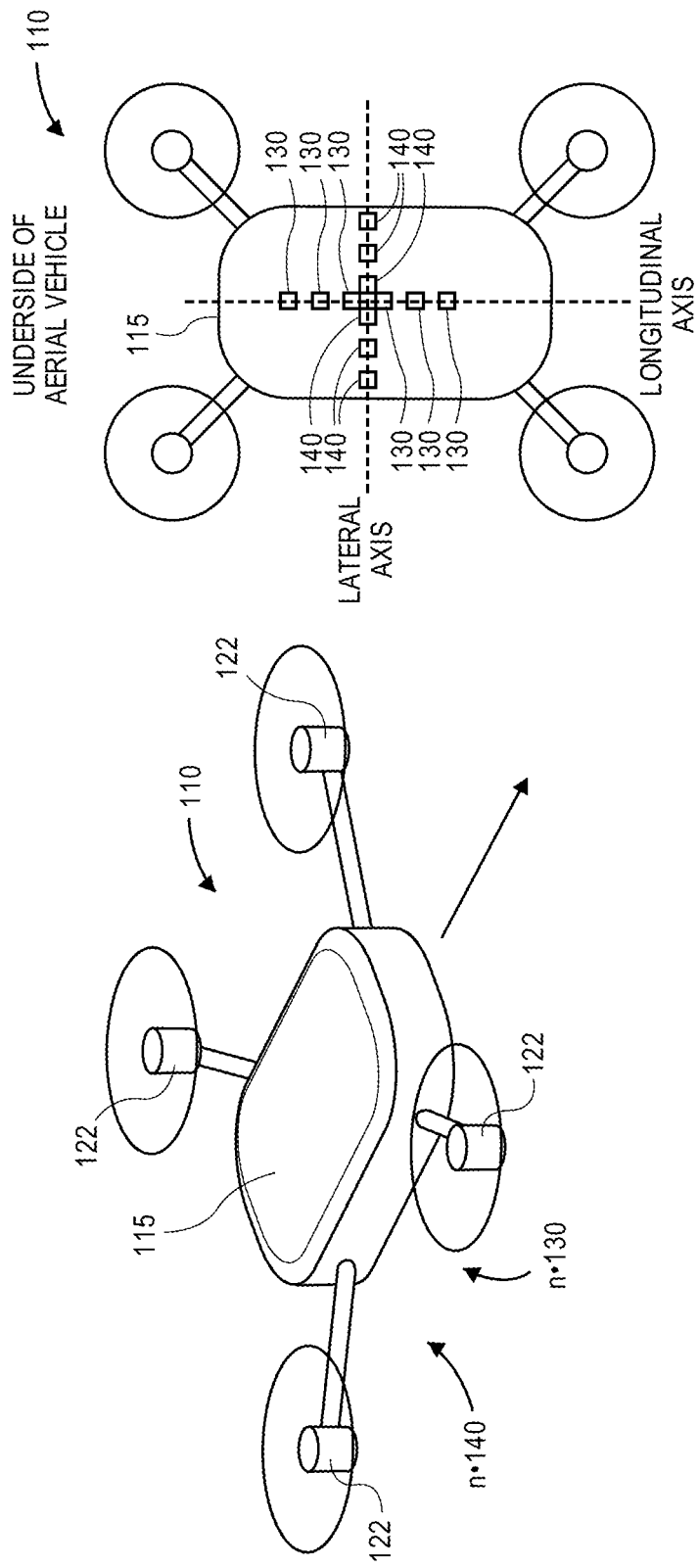

Referring to FIGS. 1A through 1F, an aerial vehicle 110 is shown. As is shown in FIG. 1A, the aerial vehicle 110 has a frame 115 and is traveling under power of four propulsion motors 122 mounted to the frame 115. On an underside of the aerial vehicle 110, a pair of arrays of n transmitters 130 and n receivers 140 are mounted to the frame 115. The n transmitters 130 are aligned along a first line, e.g., along or parallel to a longitudinal axis of the aerial vehicle 110, and the n receivers 140 are aligned along a second line, e.g., along or parallel to a lateral axis of the aerial vehicle 110. As is shown in FIG. 1A, the first line is perpendicular to the second line. Although the n transmitters 130 and the n receivers 140 are shown as being mounted on an underside of the aerial vehicle 110, those of ordinary skill in the pertinent arts will recognize that the n transmitters 130 and the n receivers 140 may be mounted in lines that are perpendicular to one another on any surface of the aerial vehicle 110, other than the underside of the aerial vehicle 110. Additionally, the n transmitters 130 and the n receivers 140 may be aligned in any orientation with respect to the construction of the aerial vehicle 110, and need not be aligned along one or more principal axes of the aerial vehicle 110.

Figure 1B:
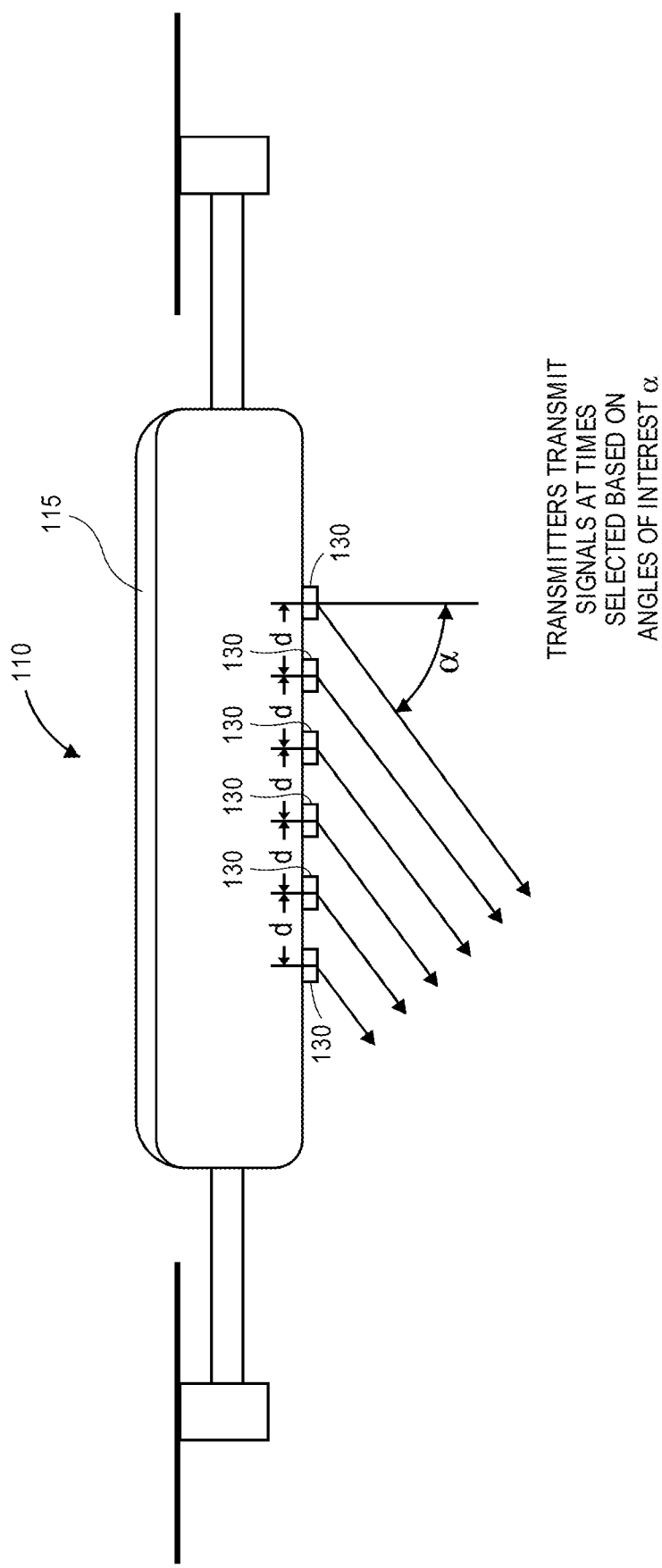

As is shown in FIG. 1B, the n transmitters 130 aligned along or parallel to the longitudinal axis are each separated by a distance d. The n transmitters 130 may transmit signals of energy at any selected angle of interest α. The signals may include electromagnetic signals, acoustic signals, or any other type or form of energy. Each of the n transmitters 130 may be programmed to transmit the signals at times selected based on the distance d, the angle of interest α, and a speed of energy in the air below the aerial vehicle 110, e.g., a speed of light for electromagnetic energy, or approximately three hundred million meters per second (or $3.0 \times 10^8$ m/s), or a speed of sound for acoustic energy, or approximately three hundred forty-three meters per second (343 m/s) in dry air.

As is shown in FIG. 1C, the n receivers 140 aligned along or parallel to the lateral axis are also each separated by the distance d. The n receivers 140 capture data regarding energy reflected from one or more objects beneath the aerial vehicle 110, or in any other location, in response to the transmission of signals of energy by the n transmitters 130 as is shown in FIG. 1B. The data may be captured in buffers of various durations and stored in one or more data stores or other systems provided aboard the aerial vehicle 110, or maintained in one or more alternate or virtual locations, e.g., in a "cloud"-based environment.

As is shown in FIGS. 1B and 1C, each of then transmitters 130 and each of the n receivers 140 are separated by the same distance d. Alternatively, in some embodiments, the distances d between each of the respective n transmitters 130 or between each of the respective n receivers 140 need not be equal to one another, e.g., the distance d. In some other embodiments, the n transmitters 130 and the n receivers 140 may be separated by different distances. Moreover, the distances between the n transmitters 130 and the n receivers 140 may be selected on any basis, including but not limited to a wavelength or a frequency of the energy transmitted by then transmitters 130. In some embodiments, the distance d between the n receivers 140 is preferably less than a wavelength of the energy transmitted by the n transmitters 130. In some other embodiments, the distance d between the n receivers 140 is less than one-half of one wavelength of the energy transmitted by the n transmitters 130.

Figure 1D:
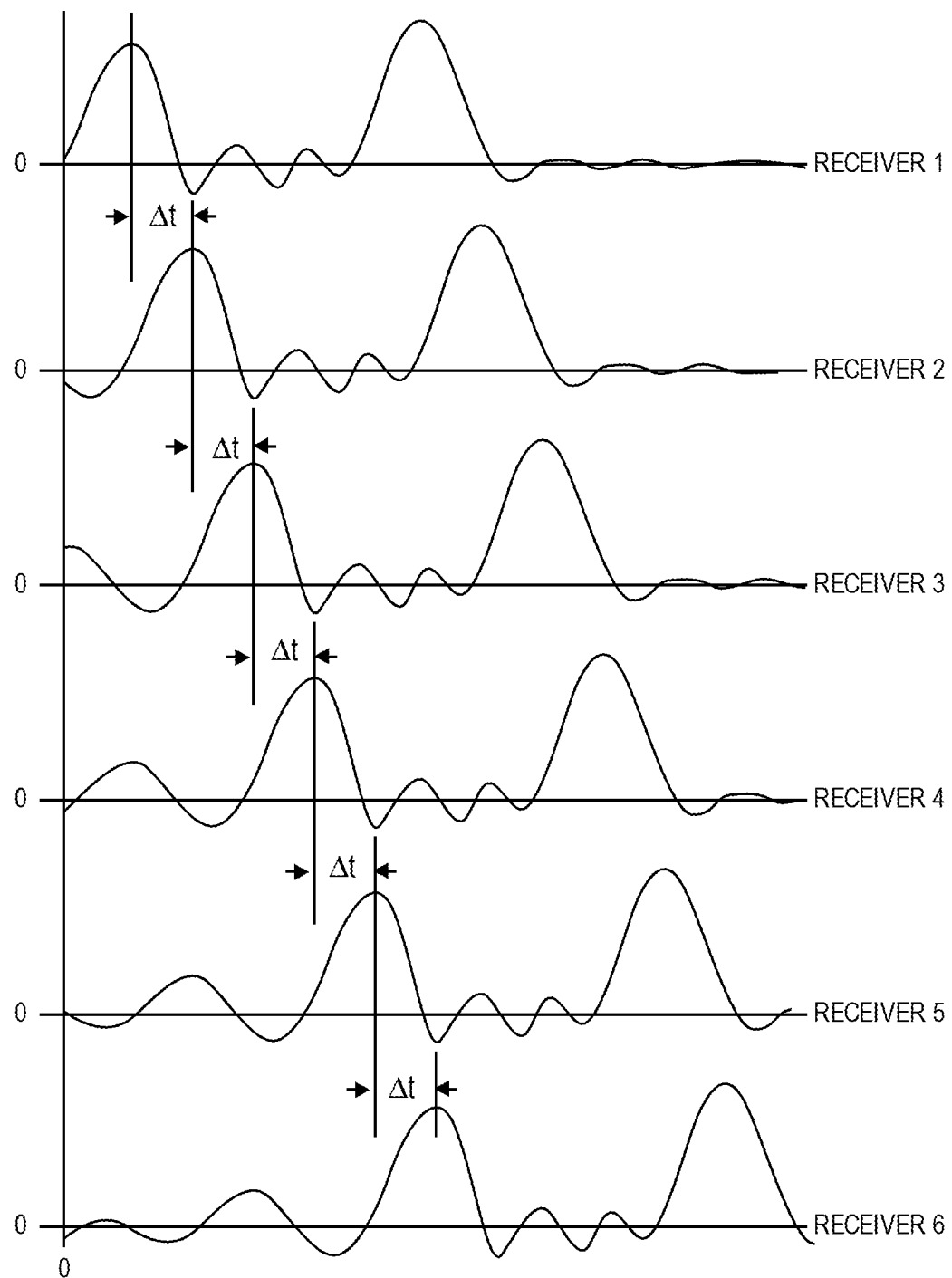

The energy received by the n receivers 140 may indicate various intensity levels in accordance with the present disclosure. Where signals transmitted by the n transmitters 130 are transmitted at normal or perpendicular angles, or where the angle of interest $\alpha$ is ninety degrees, or $\alpha=90°$, energy reflected by one or more objects may be expected to arrive at each of the n receivers 140 nearly simultaneously, such that the data captured by the n receivers 140 shows intensity levels that are coaligned with one another. As is shown in FIG. 1D, however, where the angle of interest $\alpha$ is less than ninety degrees, or $\alpha<90°$, or where the aerial vehicle 110 is in motion at times when the signals are transmitted by the n transmitters 130, plots of data representing the energies may indicate different levels of intensities being captured by the various n receivers 140 at different times, due to the angles of interest $\alpha$ at which the signals are transmitted, or changes in position of the aerial vehicle 110 between the times at which the signals are transmitted and the times at which the energies are received.

Within an operational range of the n receivers 140, energies captured by the n receivers 140 may be sampled or otherwise evaluated at selected bearings or angles, or within selected angular intervals, e.g., by calculating fixed delays by which the energies are to be shifted to correspond with such bearings or angles, or with such angular intervals. In order to determine whether an object is present along a selected bearing or angle, energies may be shifted by a fixed amount of time (e.g., a delay time) calculated with respect to the bearing or angle, e.g., a multiple of the time, wherein the multiple ranges from zero to a predetermined number of the bearings or angles (or angular intervals) within the operating range. A sum of the shifted energies, e.g., a delayed sum, may be calculated for each of such bearings or angles (or angular intervals). Whether an object is present along a given bearing or angle (or within a given angular interval) may be determined where the delayed sum of energies for that bearing or angle (or that angular interval) exceeds a predetermined threshold. A delay time may be calculated as a function of the distance d between the respective n receivers 140, a sine of a bearing or angle (or an angle within an angular interval), and a speed of energy in the air below the aerial vehicle 110, e.g., the speed of light or the speed of sound. Delay times may be calculated for each of a plurality of bearings or angles (or angular intervals) within the operating range of the n receivers 140. Energies may be shifted by fixed amounts of time corresponding to delay times calculated with respect to each of the bearings or angles (or angular intervals), and delayed sums of the energy may be calculated for each of the bearings or angles, in order to determine whether an object lies along one or more of the bearings or angles, e.g., where the delayed sums corresponding to such bearings or angles exceed a predetermined threshold.

Figure 1E:
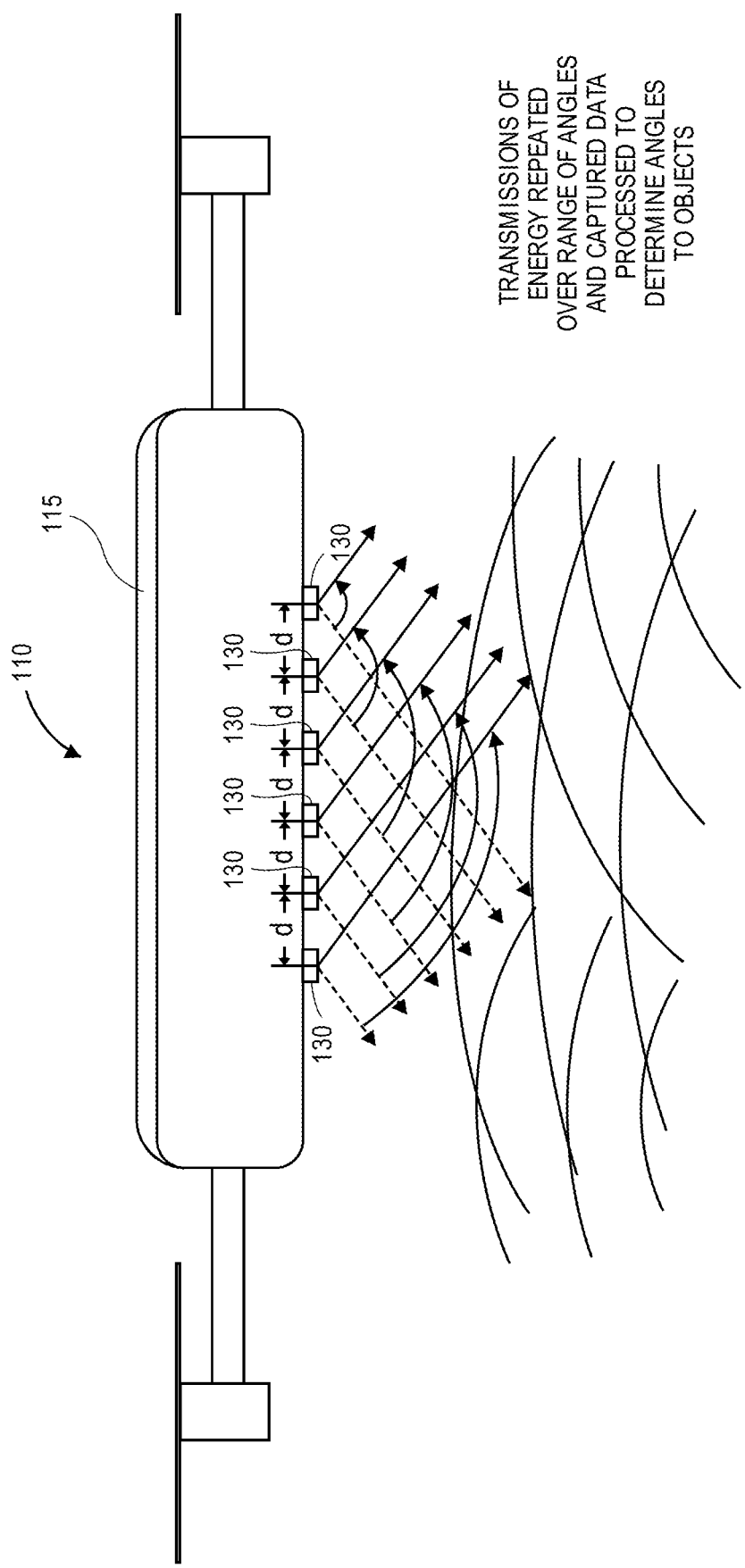

As is shown in FIG. 1E, the transmission of signals by the n transmitters 130 and the processing of data regarding reflected energy captured by the n receivers 140 may be repeated within a range of operation of the n transmitters 130 and a range of operation of the n receivers 140.

Figure 1F:
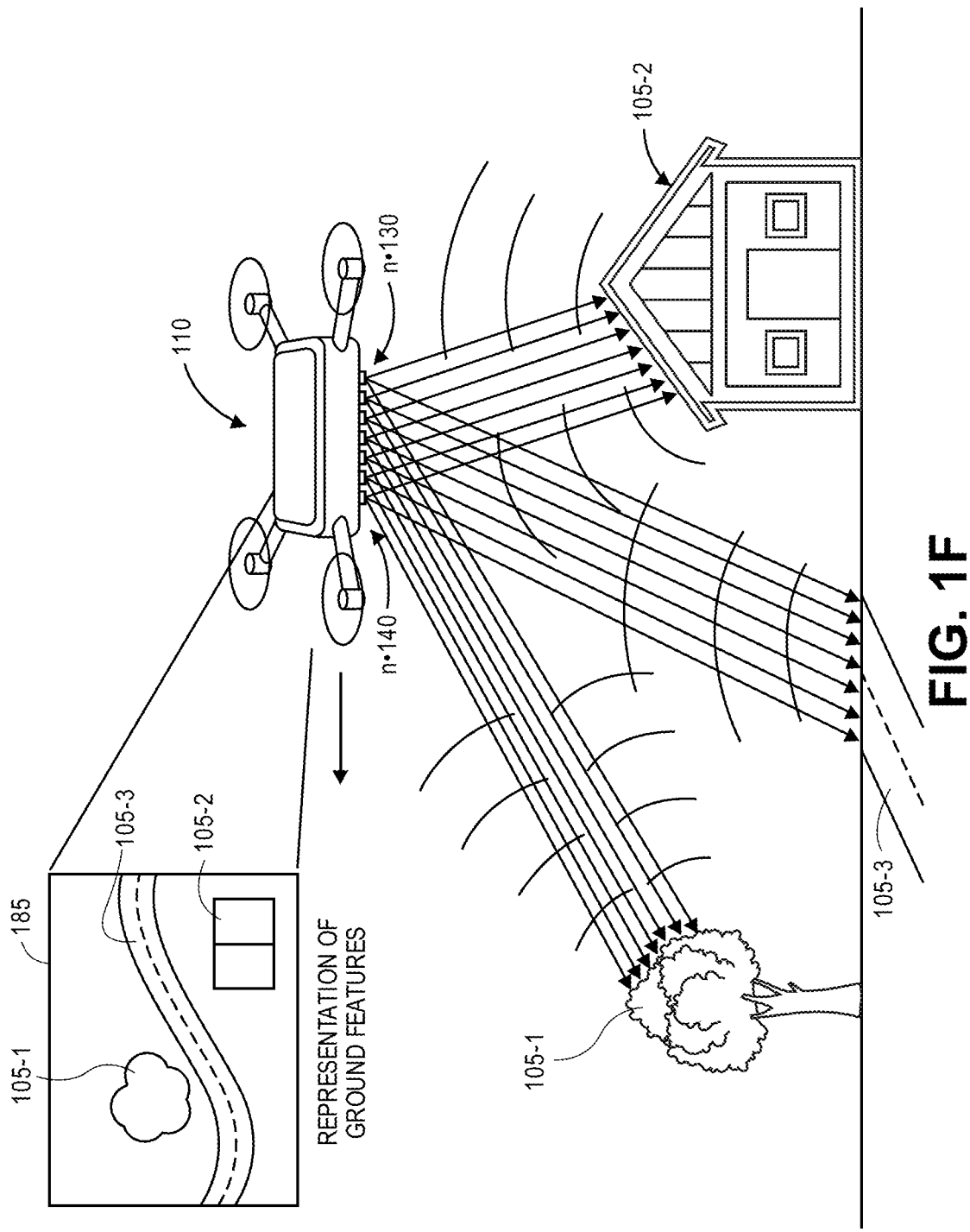

As is shown in FIG. 1F, a representation 185 of a scene including a plurality of objects 105-1, 105-2, 105-3 below the aerial vehicle 110 is shown. The representation 185 may include depth images, point clouds, maps or other representations of positions and dimensions of the objects 105-1, 105-2, 105-3 which, as is shown in FIG. 1F, may include plant life or other natural structures, infrastructure features, buildings or other artificial structures. The positions of points or distances to points included in the representation 185 may be calculated based on angles of interest at which signals are transmitted by the n transmitters 130, angles from which energies resulting from reflections of such signals are received by the n receivers 140, and times at which the reflections are received by the n receivers 140. For example, a distance to a point (e.g., a portion of an object) or a position of the point may be calculated based on a time-of-flight of a signal reflected from the point, e.g., one-half of a product of a difference between a time at which the signal was transmitted and a time at which a reflection of the signal was received and a speed of the signal, e.g., a speed of sound or a speed of light. Alternatively, the representation 185 may further include information or data regarding representations of positions and dimensions of any other objects (not shown), including but not limited to other aerial vehicles, ground-based vehicles, airborne or ground-based obstructions, humans or other animals, or any other objects. The representation 185 may be used for any purpose, including but not limited to aiding in the safe operation of the aerial vehicle 110.

Accordingly, the systems and methods of the present disclosure may include pairs of one-dimensional arrays of transmitters and receivers that are aligned perpendicular to one another. The operation of the transmitters, and the manipulation of data representing energy captured by the receivers, may be controlled to perform scans of regions surrounding the one-dimensional arrays, and to determine bearings and/or distances to objects within such regions. The one-dimensional arrays may be mounted to surfaces of vehicles (e.g., aerial vehicles, ground-based vehicles, locomotives, seagoing vessels, or others), or to surfaces that are fixed in position, and utilized for any purpose, such as to generate maps or other representations of distances to objects as determined by such systems.

The transmission of energy in waves, and the receipt of reflections of the energy, such as by one or more sonar or radar systems, are commonly used in a number of applications. Sonar, which stands for "sound navigation and ranging," is a technology or procedure by which objects are detected, or distances to such objects are determined, by transmitting acoustic energy (e.g., pulses) and capturing reflections of such energy (e.g., echoes) from the one or more objects. Objects may be detected based on the reflections of such energy. For example, a bearing or angle to an object may be determined by calculating a bearing or angle from which the reflected energy was received. Additionally, a distance to an object may be determined based on a difference in time between when an acoustic signal is transmitted and when a reflection of such energy is received. Radar, which stands for "radio detection and ranging," is a technology or procedure by which electromagnetic energy in the form of radio waves or other invisible light or energy is transmitted, e.g., in an intermittent beam, and reflections of the energy from one or more objects are detected. As with sonar, objects may be detected, and bearings or angles or distances to such objects may be determined, based on reflections of the energy detected from such objects.

While highly effective in ranging or monitoring operations, synthetic aperture systems are both financially and operationally expensive, in that synthetic aperture systems require large, square arrays of n×n receivers and at least one transmitter, for a total of at least $n^2+1$ total elements. Moreover, such arrays must be mounted or disposed in square configurations on surfaces. In mobile applications, such as aboard one or more vehicles (e.g., aerial or ground-based vehicles such as automobiles or autonomous mobile robots), the use of synthetic aperture systems is sometimes infeasible.

The systems and methods of the present disclosure are directed to the use of monostatic systems for determining bearings or angles and/or distances or ranges to objects by the transmission and receipt of energy by one-dimensional arrays that are aligned perpendicular to one another. In some embodiments, by providing a number of transmitters in a first line, and the same number of receivers in a second line that is perpendicular to the first line, the advantages of synthetic aperture systems may be achieved at lower financial operational costs. An array of n×n receivers and at least one transmitter may be replaced by a one-dimensional array of n transmitters and a one-dimensional array of n receivers, thereby reducing a total number of elements from $n^2+1$ to 2n. For example, where a synthetic aperture system includes an array of one hundred receivers arranged in a ten-by-ten grid and at least one transmitter, the one hundred one total elements of the synthetic aperture array may be replaced by twenty elements, viz., ten transmitters aligned in a first line and ten receivers aligned in a second line perpendicular to the first line, in accordance with the present disclosure. The transmitters may be configured to transmit, and the receivers may be configured to receive, energy of any type or form including but not limited to acoustic energy or electromagnetic energy at any frequency or wavelength.

The operation of the transmitters and the manipulation of data regarding energy captured by the receivers may be controlled to scan regions for one or more objects, or to determine bearings or angles and distances or ranges to such objects, over wide regions of interest. For example, each of the transmitters may be configured to transmit a common signal at selected times that are calculated to cause the common signals transmitted by the transmitters to effectively form a synthetic wave having a common wave front. Additionally, data regarding energy captured by the receivers may be manipulated to evaluate specific angles of interest based on differences in time at which intensities are detected within the data, or to determine bearings or angles to objects based on peak intensities detected within the data. Such determinations may be made based on reflections of each of the synthetic waves transmitted by a one-dimensional array of transmitters, as captured by a one-dimensional array of receivers that is perpendicular to the one-dimensional array of transmitters.

In some embodiments, a set of distances or ranges determined based on such transmissions and reflections may be processed and used to determine a map or other representation of a region. For example, where a position of one or more of the systems disclosed herein is known, e.g., based on angles at which signals are transmitted, bearings or angles from which a reflection of the signals is received, and times of flight of the signals, the position and any bearings or angles and/or distances or ranges to objects in a region may be used to generate a map or other representation of the region in three-dimensional space, which may be utilized for any purpose.

Figure 2:
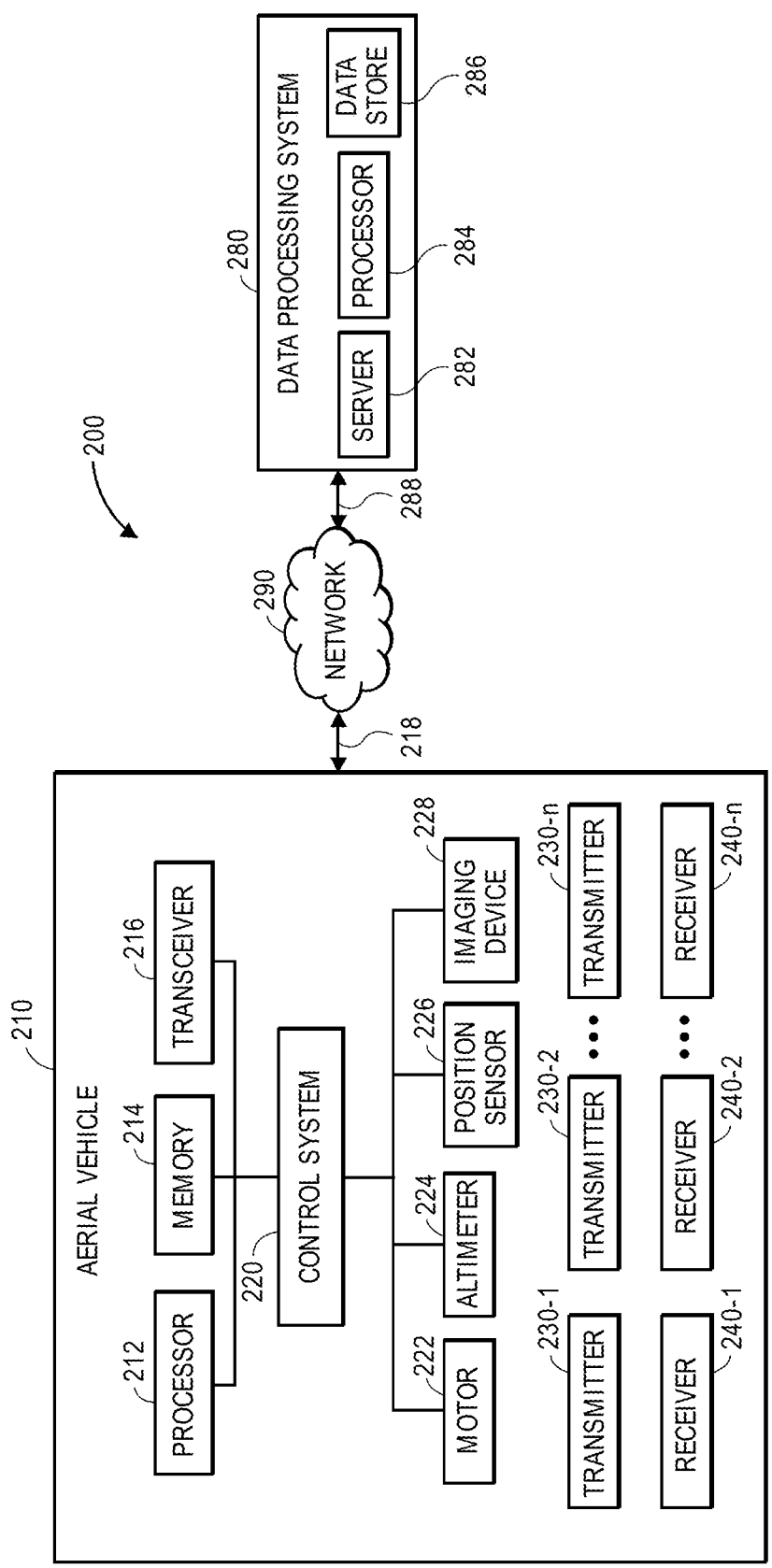
FIG. 2 is a block diagram of one system for using one-dimensional arrays in accordance with embodiments of the present disclosure.

Referring to FIG. 2, a block diagram of one system 200 for using one-dimensional arrays in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1F.

The aerial vehicle 210 includes a processor 212, a memory 214 and a transceiver 216. The aerial vehicle 210 further includes a control system 220, a plurality of propulsion motors 222, an altimeter 224, a position sensor 226 and an imaging device 228. The aerial vehicle 210 also includes a plurality of n transmitters (or transmitting elements) 230-1, 230-2 . . . 230-n and a plurality of n receivers (or receiving elements) 240-1, 240-2 . . . 240-n that are mounted or coupled to surfaces of the aerial vehicle 210 in lines or one-dimensional (e.g., 1×n or n×1) arrays that are perpendicular to one another, such as is shown in FIG. 1A.

The processor 212 may be configured to perform any type or form of computing function associated with the operation of the aerial vehicle 210, including but not limited to the execution of one or more algorithms or techniques, such as by calculating delay times for transmitting one or more signals by the transmitters 230-1, 230-2 . . . 230-n, or by determining bearings or angles from which reflected energy originated based on one or more signals captured by the receivers 240-1, 240-2 . . . 240-n. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 222, the altimeter 224, the position sensor 226 and/or the imaging device 228.

The processor 212 may also control the operation of one or more control systems or modules, such as the control system 220, for generating instructions for conducting operations of one or more of the propulsion motors 222, the altimeter 224, the position sensor 226 and/or the imaging device 228, or for interpreting information or data captured by one or more onboard sensors, e.g., the altimeter 224, the position sensor 226 and/or the imaging device 228, or others (not shown). Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. For example, the memory 214 may be configured to store one or more locations where changes in energy are observed, amounts or extents of the changes in energy, airspeeds and/or propulsion motor operating data, imaging data or any other information or data. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or orientations. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The altimeter 224 may be any device, component, system, or instrument for determining an altitude of the aerial vehicle 210, and may include any number of barometers, transmitters, receivers, range finders (e.g., laser or radar), imaging devices or other features for determining altitudes above ground.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

Although the block diagram of FIG. 2 includes a single box for a propulsion motor 222, a single box for an altimeter 224, a single box for a position sensor 226 and a single box for an imaging device 228, those of ordinary skill in the pertinent arts will recognize that any number or type of propulsion motors, altimeters, position sensors and/or imaging devices may be provided aboard the aerial vehicle 210 in accordance with the present disclosure.

The n transmitters (or transmitting elements) 230-1, 230-2 . . . 230-$n$ are any devices or systems for transmitting energy that are configured to be mounted to a surface, e.g., one or more surfaces of the aerial vehicle 210, and aligned in a common line. In some embodiments, the transmitters 230-1, 230-2 . . . 230-$n$ may be configured to emit acoustic signals in one or more synthetic waves that may be aligned at any selected angles. For example, in some embodiments, the transmitters 230-1, 230-2 . . . 230-$n$ may be configured to transmit continuous-wave (or "CW") pulses, e.g., pings, which may take the form of phase-coded transmit signals having bandwidths determined by the phase coding or frequency spread of the signals. In some embodiments, the transmitters 230-1, 230-2 . . . 230-$n$ may be configured to emit electromagnetic signals in one or more synthetic waves that may be aligned at any selected angles. Each of the transmitters 230-1, 230-2 . . . 230-$n$ may be configured to transmit signals at any power level, frequency (e.g., center frequency), wavelength or bandwidth, and within any total frequency range.

The n receivers (or receiving elements) 240-1, 240-2 . . . 240-$n$ are any devices or systems for receiving energy (e.g., electromagnetic and/or acoustic energy), or capturing information or data relating to received energy, that are configured to be mounted to a surface, e.g., one or more surfaces of the aerial vehicle 210, and aligned in a common line that is perpendicular to a common line of the transmitters 230-1, 230-2 . . . 230-$n$. Each of the receivers 240-1, 240-2 . . .

240-*n* may be configured to receive energy at any power level, frequency (e.g., center frequency), wavelength or bandwidth, and within any total frequency range.

In some embodiments, one or more of the transmitters 230-1, 230-2 . . . 230-*n* may also be a receiver, e.g., a transceiver. In some embodiments, one or more of the receivers 240-1, 240-2 . . . 240-*n* may also be a transmitter, e.g., a transceiver. Additionally, in some embodiments, one or more of the transmitters 230-1, 230-2 . . . 230-*n* or the receivers 240-1, 240-2 . . . 240-*n* may be configured to transmit or receive signals or energy of any type or form, or of multiple types or forms.

Although the block diagram of FIG. 2 includes three boxes corresponding to transmitters 230-1, 230-2 . . . 230-*n* and three boxes corresponding to receivers 240-1, 240-2 . . . 240-*n*, those of ordinary skill in the pertinent arts will recognize that any number or transmitters and receivers may be mounted in common lines that are perpendicular to one another in accordance with the present disclosure. Moreover, the transmitters 230-1, 230-2 . . . 230-*n* and the receivers 240-1, 240-2 . . . 240-*n* may be mounted to any structure, such as any type of vehicle or other system, and are not limited for use in connection with the operation of aerial vehicles in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to changes in energy of the aerial vehicle 210, along with times or positions of the aerial vehicle 210 at which such changes were observed, or imaging data captured using the imaging device 228, or, alternatively, provided in connection with one or more physical or virtual services that are configured to receive, analyze or store such information or data, or other information or data, as well as one or more other functions. The servers 282 may be connected to or otherwise communicate with the processors 284 and the data stores 286, which may store any type of information or data for any purpose. The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to execute one or more calculations regarding levels of energy of the aerial vehicle 210 and/or work performed by one or more propulsion motors 222 at any time, e.g., based on airspeeds of the aerial vehicle 210, altitudes of the aerial vehicle 210 and/or operating speeds or other characteristics of the propulsion motors 222. In some embodiments, the processor 212, the servers 282 and/or the processors 284 may be configured to generate two-dimensional or three-dimensional maps or other representations of locations of objects, as determined based on angles from which synthetic waves are transmitted by the transmitters 230-1, 230-2 . . . 230-*n*, or bearings or angles to objects from which reflections of the synthetic waves are captured by the receivers 240-1, 240-2 . . . 240-*n*. In some embodiments, the processor 212, the servers 282 and/or the processors 284 may be configured to determine an optimal path or route between two locations for the execution of a given task by the aerial vehicle 210 or one or more other aerial vehicles (not shown). The processor 212, the servers 282 and/or the processors 284 may determine an optimal path or route based on any factor or element, including but not limited to times required to travel on any paths of an optimal route, any costs associated with traveling on the paths, or any other intrinsic or extrinsic factors, such as according to one or more traditional shortest path or shortest route algorithms.

The aerial vehicle 210 and/or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, a one-dimensional array of transmitters may be mounted along a common line that is perpendicular to a common line along which a one-dimensional array of receivers is mounted, and utilized for any reason, such as in accordance with one or more ranging operations or processes. Signals transmitted by the one-dimensional array of transmitters at selected angles may reflect off objects and be captured by the one-dimensional array of receivers, and further processed to identify angles from the one-dimensional array of receivers at which such objects are located, or ranges to such objects.

Figure 3:
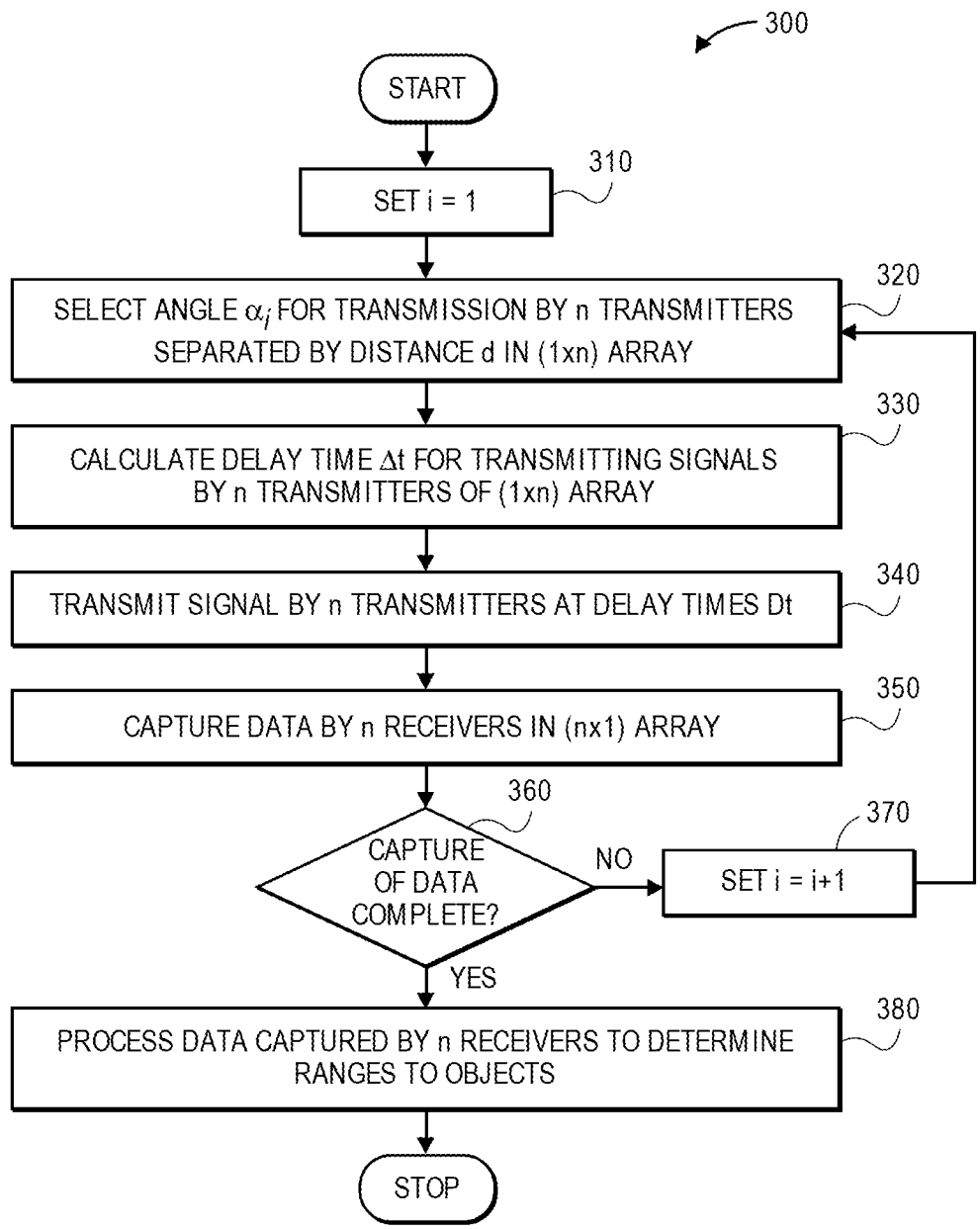
FIG. 3 is a flow chart of one process for using one-dimensional arrays in accordance with embodiments of the present disclosure.

Referring to FIG. 3, a flow chart 300 of one process for using one-dimensional arrays in accordance with embodiments of the present disclosure is shown. At box 310, a value of a step variable i is set equal to one, or i=1. At box 320, an angle $\alpha_i$, for transmitting signals by n transmitters that are separated by a distance d in a (1×n) array is selected. For example, the n transmitters may be aligned in a common line on an external surface of an aerial vehicle or any other vehicle, or any other system. The angle $\alpha_i$, may be a single angle, or within an angular range of operation of each of the n transmitters, typically not greater than one hundred eighty degrees where the n transmitters are mounted to a flat surface.

At box 330, a delay time $\Delta t$ is calculated for transmitting each of the signals by the n transmitters of the (1×n) array. The delay time $\Delta t$ represents a time between the transmission of a signal at the selected angle cu by one of the n transmitters and the transmission of a signal by another of then transmitters. The delay time may be calculated as a function of the distanced, the angle $\alpha_i$, and the speed of the signals in a medium, e.g., air, namely, the speed of light for electromagnetic signals and the speed of sound for acoustic signals. For example, where a first one of the n transmitters transmits a signal at the selected angle at a time $t_0$, a second one of the n transmitters in the line may transmit a signal at the selected angle at a time $t_1=t_0+\Delta t$, while a third one of the n transmitters in the line may transmit a signal at the selected angle at a time $t_2=t_1+\Delta t=t_0+2\Delta t$, and so on and so forth. Alternatively, where two or more of the n transmitters are separated by a distance other than d, a different delay time may be calculated for such transmitters.

At box 340, signals are transmitted by each of the n transmitters at the angle cu and in accordance with the delay times calculated at box 330. The signals transmitted by the n transmitters at box 340 effectively result in a synthetic wave having a common wave front being transmitted along a direction of the angle $\alpha_i$. At box 350, data is captured by n receivers in an (n×1) array. For example, the n receivers may be aligned in a common line on the external surface of an aerial vehicle or any other vehicle, or any other system, and the common line may be perpendicular to the common line of the (1×n) array of the n transmitters. The data captured may include indicators or measurements of intensities (e.g., sound pressure levels or illuminances) of the reflected energy as sensed by each of the n receivers.

At box 360, whether the ranging process is complete is determined. If the ranging process is not complete, then the process advances to box 370, where a value of the step variable i is incremented by one, or i is set to equal i+1, before returning to box 320, where another al for transmitting signals by n transmitters that are separated by a distance din a (1×n) array is selected. If the ranging process is complete, however, then the process advances to box 380, where the data captured by the n receivers is processed to determine ranges to objects from which the signals transmitted at box 340 were reflected, such as by determining angles from which the reflections were received based on differences in time at which the data was captured by each of the respective receivers, and angles at which the signals were transmitted at box 340, and the process ends.

As is discussed above, a plurality of transmitters that are aligned along a common line may be programmed to transmit a series of signals in parallel, at selected angles, and at specific times, thereby resulting in a synthetic wave having a common front. The times at which the transmitters are programmed to transmit the signals are shifted with respect to their order along the line and not arbitrarily. Referring to FIGS. 4A through 4D, views of aspects of one system for using one-dimensional arrays in accordance with embodiments of the present disclosure are shown. Except where otherwise noted, reference numerals preceded by the number "4" shown in FIGS. 4A through 4D indicate components or features that are similar to components or features having reference numerals preceded by the number "2" shown in FIG. 2 or by the number "1" shown in FIGS. 1A through 1F.

Figure 4A:
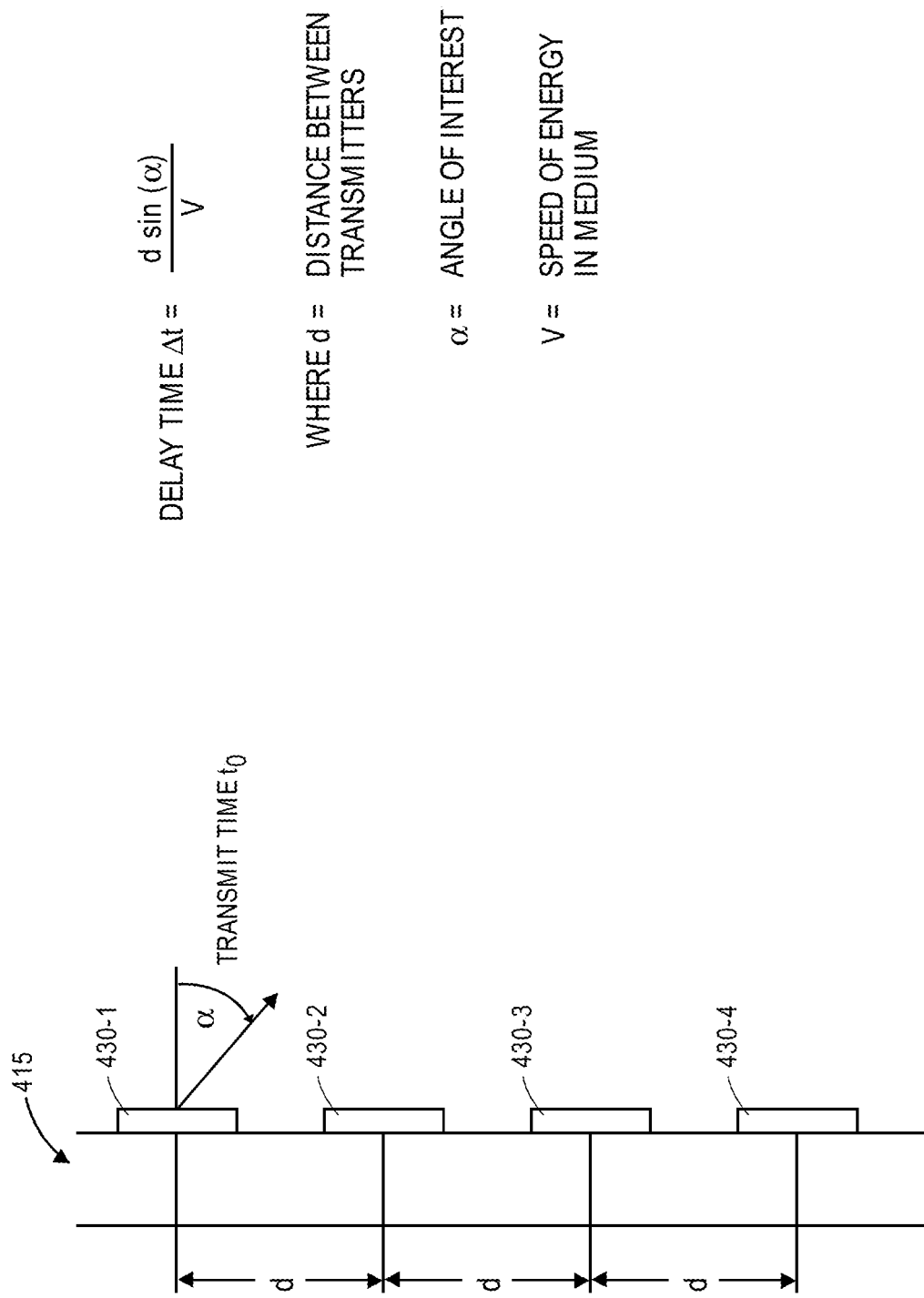

As is shown in FIG. 4A, a plurality of transmitters 430-1, 430-2, 430-3, 430-4 are mounted to a frame 415 along a common line. The transmitters 430-1, 430-2, 430-3, 430-4 are spaced at intervals of a distanced. Each of the transmitters 430-1, 430-2, 430-3, 430-4 may be programmed to transmit a synthetic wave at an angle of interest α. At a time $t_0$, the transducer 430-1 may be programmed to transmit a signal (e.g., one or more pulses at selected power levels, frequencies, wavelengths or the like) at the angle of interest α, which may be determined with respect to a normal from the transmitter 430-1, such as is shown in FIG. 4A, or, alternatively, with respect to the common line along which the transmitters 430-1, 430-2, 430-3, 430-4 are mounted. A next transmitter, viz., the transmitter 430-2, may be programmed to transmit a signal at the angle of interest α after a delay time Δt after the time to at which the first signal was transmitted by the transmitter 430-1. The delay time Δt may be calculated based on the angle of interest α, the distance d between the transmitter 430-1 and the transmitter 430-2, and the speed V of the energy within the medium (e.g., air) surrounding the frame 415. In particular, and as is shown in FIG. 4A, the delay time Δt may be calculated by dividing a product of the distance d and a sine of the angle of interest α by the speed V, e.g., the speed of light for electromagnetic energy, or the speed of sound for acoustic energy.

As is shown in FIG. 4B, the transmitter 430-2 transmits a signal along the angle of interest α at a time $t_1$, which follows the time to at which the transmitter 430-1 transmitted a signal along the angle of interest α by the delay time Δt. For example, where the transmitters 430-1, 430-2 are spaced by a distance d of ten centimeters, or 0.100 meters, and configured to transmit acoustic signals in air, and the angle of interest α is forty-five degrees, or 45°, the transmitter 430-2 may be programmed to transmit an acoustic signal along the angle of interest α approximately 0.206 milliseconds after the transmitter 430-1 transmits an acoustic signal along the angle of interest α.

Similarly, as is shown in FIG. 4C, the transmitter 430-3 transmits a signal along the angle of interest α at a time $t_2$, which follows the time $t_1$ at which the transmitter 430-2 transmitted a signal along the angle of interest α by the delay time Δt, and follows the time to at which the transmitter 430-1 transmitted a signal along the angle of interest α by twice the delay time Δt, or 2Δt. Finally, as is shown in FIG. 4D, the transmitter 430-4 transmits a signal along the angle of interest α at a time $t_3$, which follows the time $t_2$ at which the transmitter 430-3 transmitted a signal along the angle of interest α by the delay time Δt, and follows the time $t_1$ at which the transmitter 430-2 transmitted a signal along the angle of interest α by twice the delay time Δt, or 2Δt, while also following the time to at which the transmitter 430-1 transmitted a signal along the angle of interest α by three times the delay time Δt, or 3Δt.

Thus, as is also shown in FIG. 4D, the transmission of signals by the transmitters 430-1, 430-2, 430-3, 430-4 along the angle of interest α, separated by multiples of the delay times Δt, results in the generation of a synthetic wave of energy having a common wave front along the angle of interest α.

Figure 5:
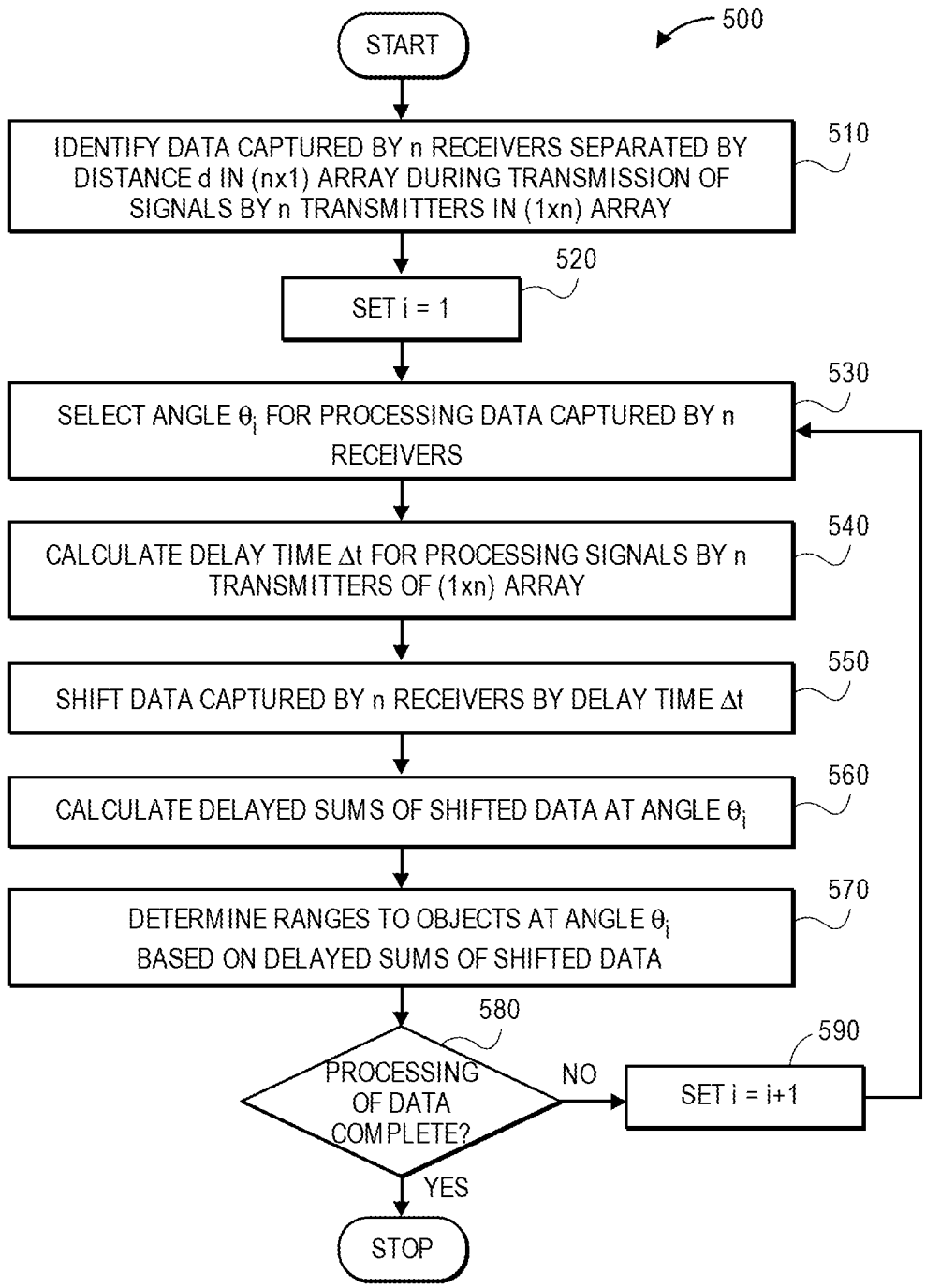
FIG. 5 is a flow chart of one process for using one-dimensional arrays in accordance with embodiments of the present disclosure.

As is discussed above, a one-dimensional array of receivers may be mounted along a common line that is perpendicular to a common line along which a one-dimensional array of transmitters is mounted, and utilized for any reason, such as in accordance with one or more ranging operations or processes. Signals received by the one-dimensional array of receivers may be processed to identify bearings or angles from the one-dimensional array of receivers from which objects that reflected such signals are located, such as by shifting energy or data captured by the respective receivers by multiples of delay times calculated for each of a plurality of angles within operational ranges of such receivers. Referring to FIG. 5, a flow chart 500 of one process for using one-dimensional arrays in accordance with embodiments of the present disclosure is shown. At box 510, data regarding energies captured by n receivers separated by a distance din a one-dimensional (n×1) array during the transmission of signals by n transmitters in a (1×n) array is identified. In some embodiments, the data may be identified in real time or in near-real time, e.g., in one or more buffers for each of the n receivers, or in one or more data stores or memory components. Alternatively, the data may have been captured at any earlier time and stored in one or more data stores or memory components. At box 520, a value of a step variable i is set equal to one, or i=1.

At box 530, an angle $θ_i$ for processing data captured by the n receivers is selected. The angle $θ_i$ may be within an angular operational range of the n receivers, which may be divided into a number of angles or angular intervals, and the angle $θ_i$ may define, bound or otherwise correspond to one of the angular intervals. Alternatively, the angle $θ_i$ may correspond to a single bearing or angle for which a distance or range to any objects is desired, or be within a selected or narrowed range for which specific values of distances or ranges are desired. Distances to points (e.g., portions of one or more objects) or positions of points may be calculated based on times-of-flight of signals reflected from the points, e.g., one-half of a product of a difference between a time at which the signal was transmitted and a time at which a reflection of the signal was received and a speed of the signal, e.g., a speed of sound or a speed of light.

At box 540, a delay time Δt is calculated for processing energy reflected from signals transmitted by the n transmitters of the (1×n) array based on the angle $θ_i$ selected at box 530. The delay time Δt may be calculated as a function of the distance d between pairs of the receivers, the angle $θ_i$, and the speed of the energy in the medium.

At box 550, data captured by each of the n receivers is shifted by a corresponding delay time Δt. For example, with respect to data captured by a first one of the n receivers (e.g., a multiple of zero), data captured by a second one of the n receivers is shifted by one Δt (e.g., a multiple of one), while data captured by a third one of the n receivers is shifted by two Δts (e.g., a multiple of two), and so on and so forth. At box 560, delayed sums of the shifted data corresponding to the angle $θ_i$ are calculated. For example, sums of the shifted data may be calculated for the angle $θ_i$ of interest by adding intensities of energy captured by each of the n receivers, as adjusted by a multiple of the delay time Δt. Where the delayed sum of shifted data for a given angle $θ_i$ of interest exceeds a predetermined threshold, an object may be deemed to be located along the angle $θ_i$ of interest with a sufficiently high degree of confidence. Alternatively, in some embodiments, peaks in intensities of the data captured by each of the n receivers may be identified first, and delay times between such peaks may be determined, with the bearings or angles to one or more objects being identified from the delay times.

At box 570, ranges to objects at the angle $θ_i$ are determined based on the delayed sums of the shifted data. For example, where delayed sums of shifted data corresponding to the angle $θ_i$ exceed a predetermined threshold, one or more ranges to objects along the angle $θ_i$ may be determined, e.g., based on differences between times at which the signals were transmitted and the times tat which reflections of the energies were received, or on any other basis.

At box 580, whether the processing of data in accordance with the ranging process is complete is determined. If the processing of data is not complete, then the process advances to box 590, where a value of the step variable i is incremented by one, or i is set to equal i+1, before returning to box 530, where another angle $\theta_i$ for processing data captured by the n receivers is selected. If the processing of data is complete, however, then the process ends. In some embodiments, the ranges may be used to generate a map or other representations of objects at a scene, or for any other purpose.

Referring to FIGS. 6A through 6D, views of aspects of one system for using one-dimensional arrays in accordance with embodiments of the present disclosure are shown. Except where otherwise noted, reference numerals preceded by the number "6" shown in FIGS. 6A through 6D indicate components or features that are similar to components or features having reference numerals preceded by the number "4" shown in FIGS. 4A through 4D, by the number "2" shown in FIG. 2 or by the number "1" shown in FIGS. 1A through 1F.

Figure 6A:
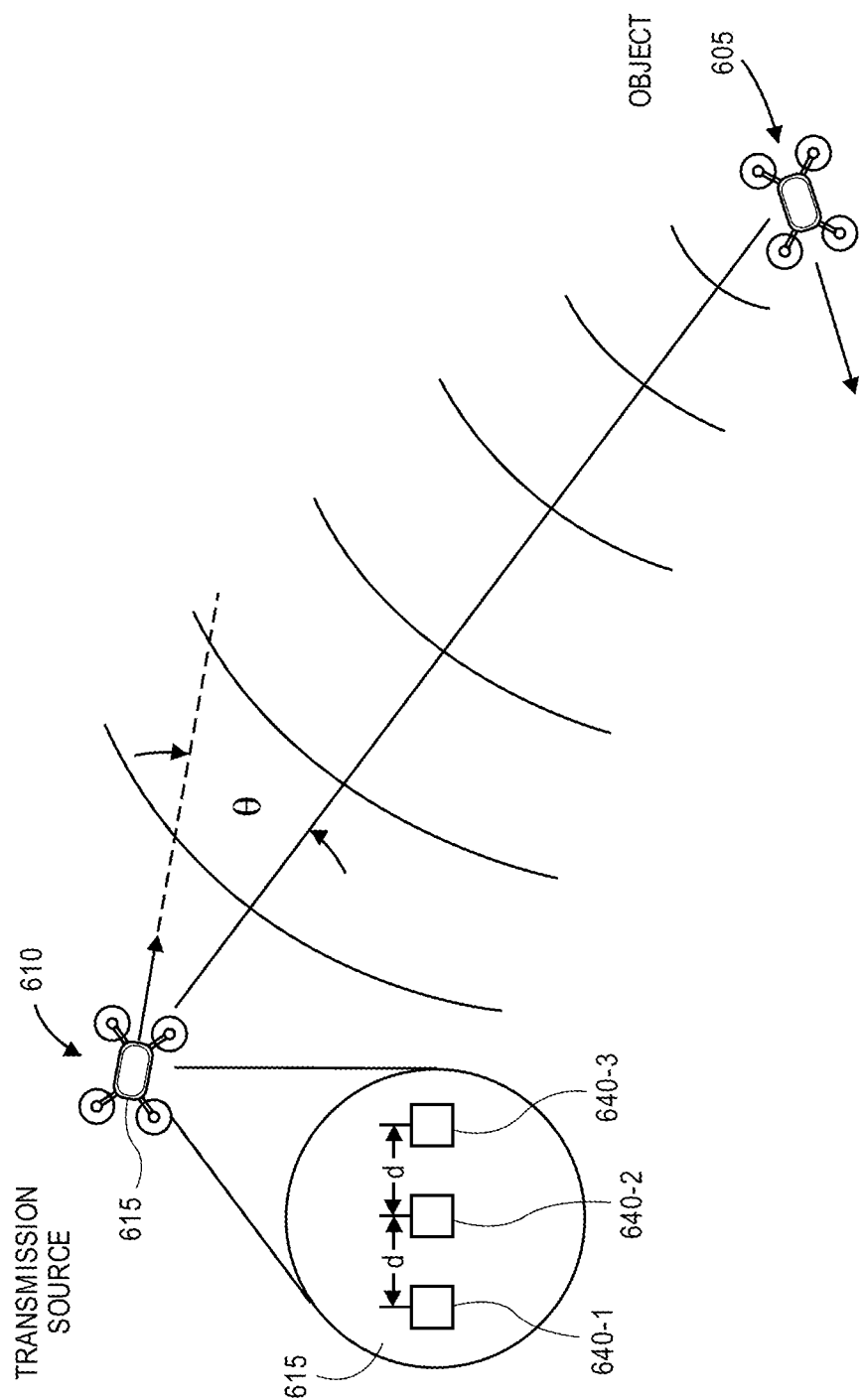

As is shown in FIG. 6A, a plurality of receivers 640-1, 640-2, 640-3 are mounted to a frame 615 of an aerial vehicle 610 along a common line. The receivers 640-1, 640-2, 640-3 are spaced at intervals of a distance d. After transmitting one or more synthetic waves by a plurality of transmitters (not shown) mounted to the frame in a common line that is perpendicular to the common line of the receivers 640-1, 640-2, 640-3, energy is reflected from an object 605 (e.g., another aerial vehicle) at a bearing θ from the aerial vehicle 610.

In accordance with the present disclosure, data regarding energy reflected from the object 605 may be captured by the receivers 640-1, 640-2, 640-3 and processed to determine the bearing θ. As is shown in FIG. 6B, the energy reflected from the object 605 reaches the receivers 640-1, 640-2, 640-3 at different times. For example, the receiver 640-1, which is nearest to the object 605, captures data regarding the energy first, while the receiver 640-2, which is farther from the object 605 than the receiver 640-1, captures data regarding the energy second, and the receiver 640-3, which is farthest from the object 605, captures data regarding the energy last.

Figure 6C:
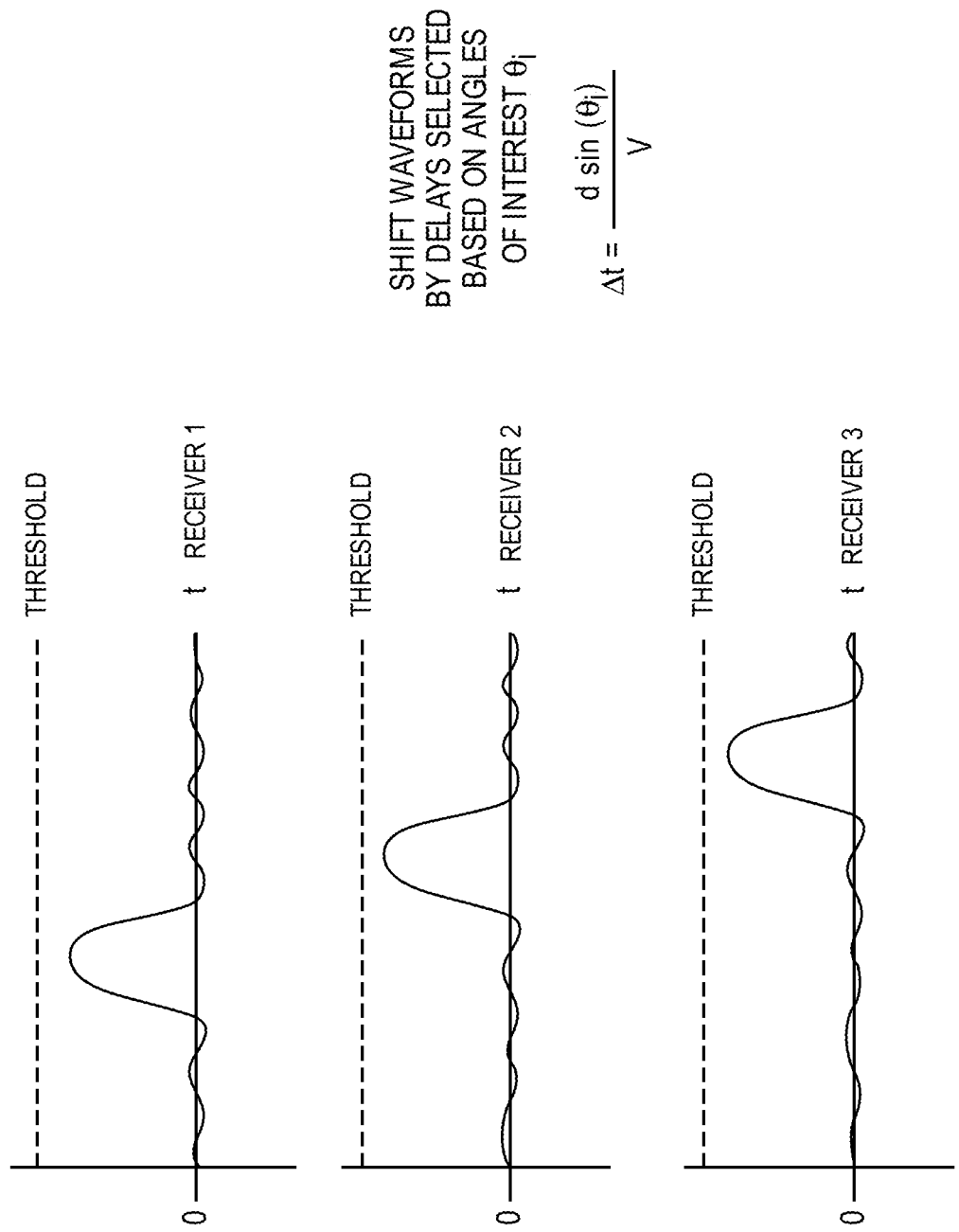

As is shown in FIG. 6C, waveforms of data representing the energy captured by the receivers 640-1, 640-2, 640-3 indicate that peak intensities of energy reflected from the object 605 and captured by the individual receivers 640-1, 640-2, 640-3 at different times do not exceed a predetermined threshold at any time. Therefore, none of the waveforms, by themselves, indicate the presence of any objects.

In some embodiments, the data may be scanned to determine whether the energy captured by the receivers 640-1, 640-2, 640-3 collectively indicates the presence of one or more objects at various angular intervals by instituting delay times corresponding to the angular intervals, and shifting the waveforms of the data according to multiples of such delay times, e.g., shifting the waveforms by zero, one, two or more of the delay times corresponding to the angular intervals.

For example, as is shown in FIG. 6C, and as is discussed above, a delay time Δt by which one or more of the waveforms may be shifted may be calculated for a selected angle of interest $\theta_i$ by dividing a product of the distance d and a sine of the angle of interest $\theta_i$ by a speed V of the energy, e.g., the speed of light for electromagnetic energy, or the speed of sound for acoustic energy, within the medium. The waveforms for the receivers are shifted with respect to their order along the line and not arbitrarily. For example, in a line of receivers numbered from one to n, a waveform of energy captured by a given receiver i in the line is shifted by an amount of time (i−1)·Δt, such that the waveform captured by a first receiver in the line is shifted by an amount of time (1−1)·Δt=0, i.e., is not shifted, and that the waveform captured by a last (or nth) receiver in the line is shifted by an amount of time (n−1)·Δt.

Figure 6D:
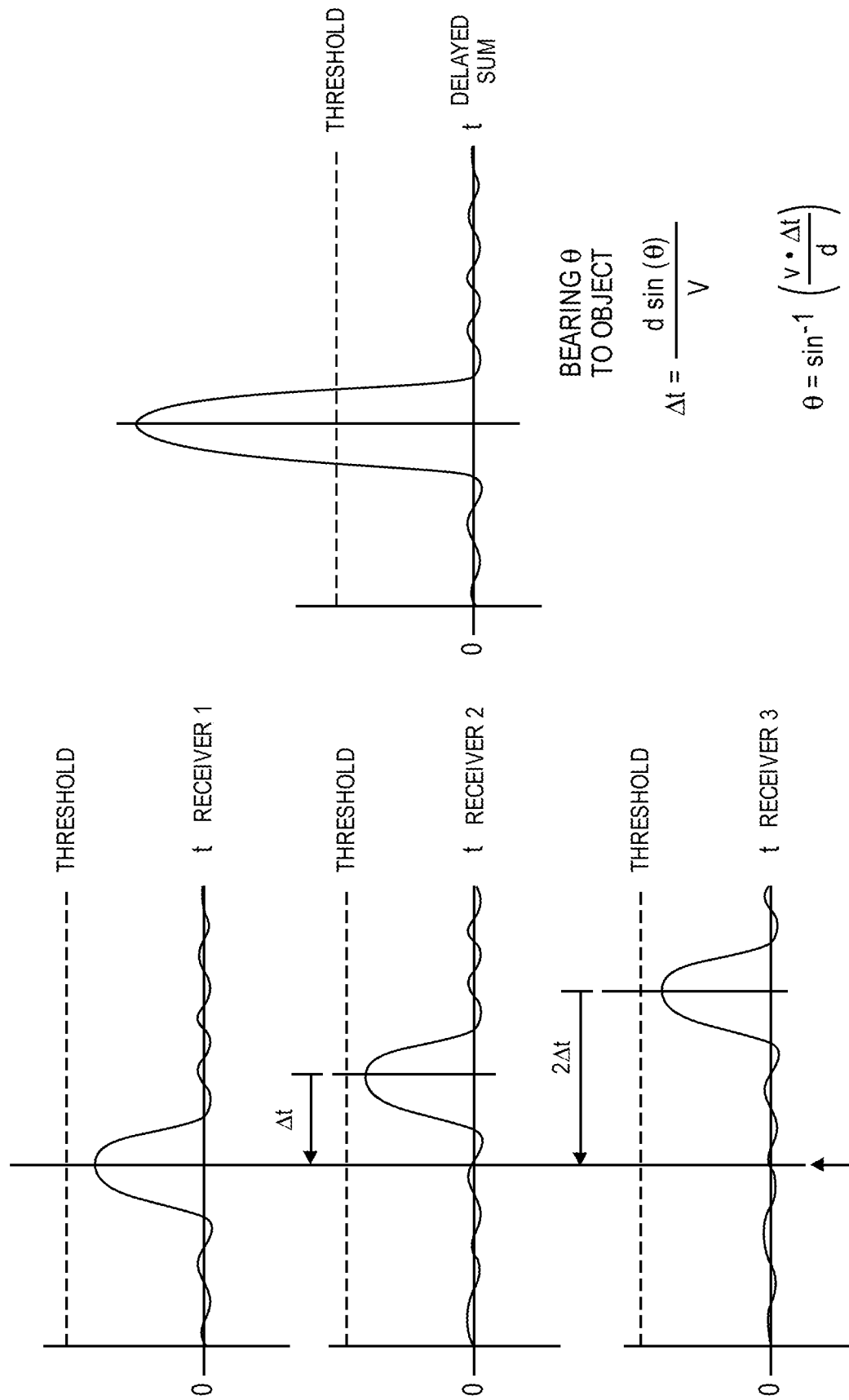

As is shown in FIG. 6D, the presence of the object 605 at an angle θ is determined based on a delayed sum of the intensities shifted by multiples of delay times Δt calculated based on the angle θ. As is shown in FIG. 6D, where the waveforms of data indicate that peak amplitudes are observed within waveforms of data captured by the receiver 640-1 and the receiver 640-2 at different times, the angle θ to the object 605, or to a source of the reflected energy, may be calculated by dividing a product of the speed V and the difference Δt between the times by the distance d between the receivers 640-1, 640-2, 640-3, and taking an arc sine (or an inverse sine) of this quotient, viz., v·Δt/d, or $\theta = \sin^{-1}(v \cdot \Delta t/d)$. Alternatively, as is shown in FIG. 6D, where peak intensities are identified in data captured by receivers at specific times, the angle θ to the object may be calculated based on differences in times at which the peak intensities are observed within the data.

Figure 7:
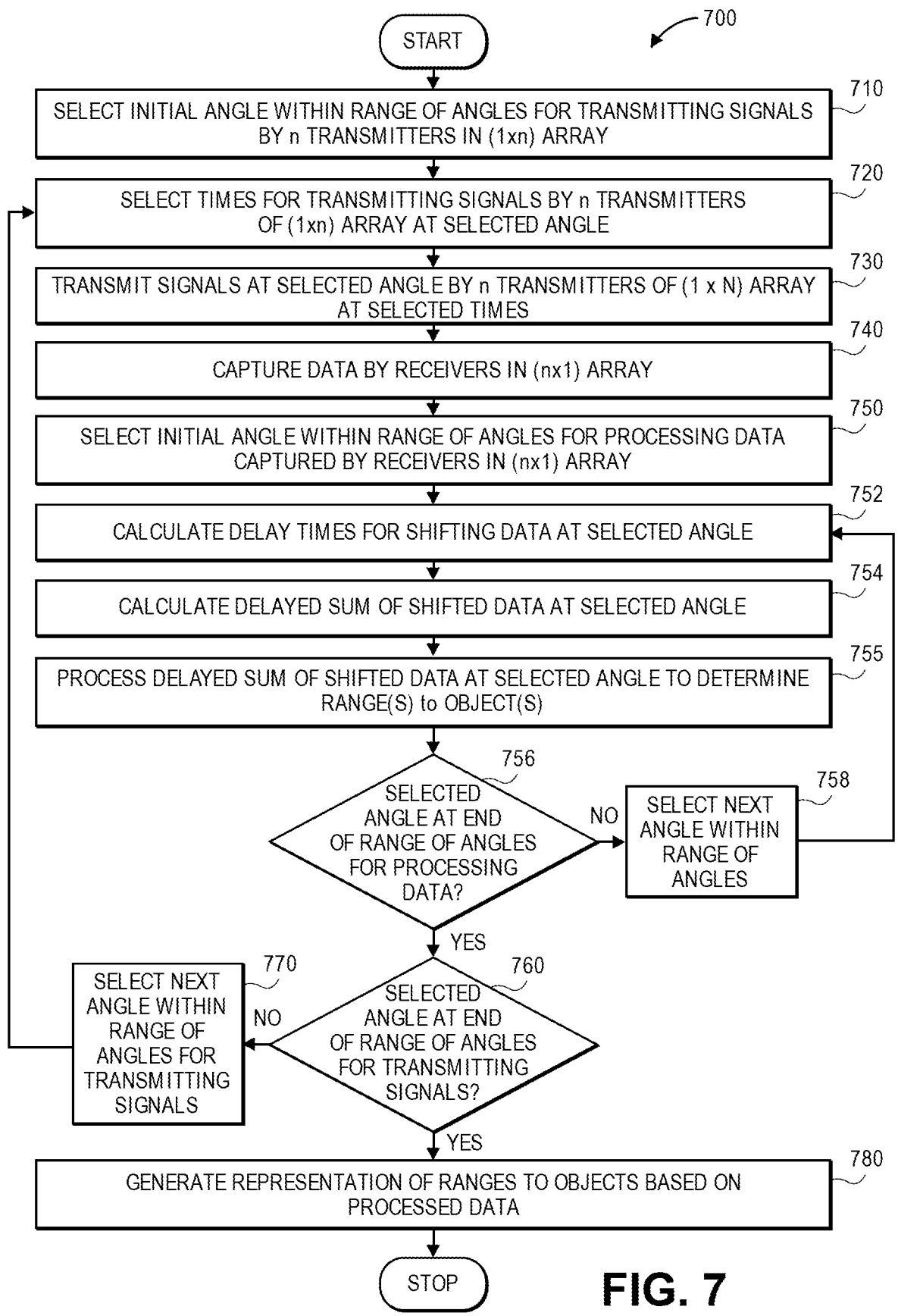
FIG. 7 is a flow chart of one process for using one-dimensional arrays in accordance with embodiments of the present disclosure.

As is discussed above, the transmission of data by one-dimensional arrays of transmitters and the receipt and processing of data by one-dimensional arrays of receivers perpendicular to such transmitters may be performed independently or in concert with one another to determine directions or ranges to one or more objects on a scene, or to generate a representation of such ranges. Referring to FIG. 7, a flow chart 700 of one process for using one-dimensional arrays in accordance with embodiments of the present disclosure is shown. At box 710, an initial angle within a range of angles is selected for transmitting angles by n transmitters of a (1×n) array. For example, as is discussed above, each of then transmitters may be mounted to a surface along a common line, and separated by a known distance.

At box 720, times for transmitting signals by the n transmitters of the (1×n) array at a selected angle within the range are selected. For example, as is discussed above, delay times separating the transmission of signals by adjacent transmitters may be calculated by dividing a product of a distance between the transmitters and a sine of the selected angle by a speed of a selected energy, e.g., sound or electromagnetic energy, and the times at which each of the n transmitters is to transmit one or more signals may be selected based at least in part on the delay times. As is discussed above, the times for transmitting signals by the n transmitters of the (1×n) array are selected with respect to their position within the array and not arbitrarily. At box 730, signals are transmitted by the n transmitters of the (1×n) array at the selected times. At box 740, data is captured by n receivers in an (n×1) array.

At box 750, an initial angle within a range of angles for processing the data captured by the n receivers in the (n×1) array is selected. The range of angles may be defined by any physical or operational constraints of the receivers, or in any other manner. At box 752, delay times for shifting the data in accordance with the selected angle are calculated, such as by multiplying a distance between a pair of receivers by a sine of the initial angle and dividing this product by the speed of the energy within the medium. As is discussed above, the times at which waveforms of data regarding energy captured by the n receivers of the (n×1) array are calculated with respect to their position within the array and not arbitrarily. At box 754, delayed sums are calculated for shifted data at the selected angle, e.g., by stacking or summing waveforms or other representations of the data, such as is shown in FIG. 6D.

At box 755, the delayed sums calculated at box 754 are analyzed to determine ranges to any objects identified along the selected angle, e.g., based on times at which the signals are transmitted at box 730 and times at which reflections of such signals are identified in the data captured at box 740. At box 756, whether the selected angle is at an end of a range of angles for processing data captured by the n receivers of the (n×1) array is determined. If the selected angle is not at the end of the range of the angles, then the process advances to box 758, where a next angle is selected within the range of angles, before returning to box 752, where delay times for shifting the data in accordance with the newly selected angle are calculated, to box 754, a delayed sum of the shifted data is calculated along the newly selected angle, and to box 755, where delayed sums calculated at box 754 are analyzed to determine ranges to any objects identified along the newly selected angle. In this regard, by selecting additional angles within the range of angles, the data captured by the receivers in the (n×1) array may be effective scanned across the range of angles in order to determine whether any objects are present within the range of angles, based on the data captured regarding the reflected energies.

If the selected angle is at the end of the range of angles for processing data captured by then receivers of the (n×1) array, then the process advances to box 760, where whether the angle at which the signals were transmitted at box 730 is at an end of the range of the angles for transmitting the signals is determined. If the selected angle is not at the end of the range of angles for transmitting the signals, then the process advances to box 770, where another angle within the range of angles for transmitting the signals is selected, before returning to box 720, where times for transmitting signals by the n transmitters of the (1×n) array at the angle selected at box 770 are selected.

If the selected angle is at the end of the range of angles for processing data captured by then receivers of the (n×1) array, then the process advances to box 780, where a representation of ranges to objects is generated based on the processed data, and the process ends. In some embodiments, where peak intensities are identified at adjacent angles or angular intervals within the range of angles, a bearing or angle to the objects may be more precisely determined by defining a narrow range of angles between the adjacent angles, and repeating the process shown in the flow chart 700 for the narrow range.

Thus, after transmitting a synthetic wave having a common front along a selected angle by a one-dimensional array of transmitters, data captured using a one-dimensional array of receivers that is perpendicular to the one-dimensional array of transmitters may be processed at selected angles, or by aligning peak intensities, to scan a range of angles of the one-dimensional array of receivers for objects or to determine bearings to objects based on intensities of the captured data. The process may be repeated for each synthetic wave transmitted by the one-dimensional array of transmitters.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, as is discussed above, the one-dimensional arrays may be mounted to surfaces of mobile vehicles (e.g., aerial vehicles, ground-based vehicles, locomotives, seagoing vessels, or others), or to surfaces that are fixed in position, and utilized for any purpose, such as to generate maps or other representations of distances to objects as determined by such systems.

Moreover, although some of the embodiments disclosed herein reference one-dimensional arrays of transmitters and receivers that are aligned perpendicular to one another, the systems and methods disclosed herein are not so limited. Rather, one or more of the systems and methods disclosed herein may rely on the use of one-dimensional arrays of transmitters and receivers that are aligned in substantially (e.g., nearly) perpendicular configurations with respect to one another, or in non-perpendicular configurations with respect to one another. In such configurations, angles selected for the transmissions of signals, or delay times calculated based on such angles, may be modified to account for the non-perpendicular configuration of the transmitters and receivers. Likewise, in such configurations, delay times or shifts of energy or data received may be modified to account for the non-perpendicular configuration.

Furthermore, the one-dimensional arrays of the present disclosure may be subsets or portions of larger arrays of elements, e.g., transmitters and/or receivers. For example, where a multidimensional array includes a plurality of transmitters and/or receivers arranged in rows or columns of an array, the operation of transmitters in one of the rows or columns and the manipulation of data captured by receivers in one of the columns or rows may be controlled to perform scans of areas surrounding the one-dimensional arrays, and to determine bearings and/or distances to objects.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more maps or other cartographic representations of energy levels are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
   a frame;
   at least one propulsion motor mounted to the frame;
   a plurality of acoustic elements mounted to the frame, wherein the plurality of acoustic elements consists of:
      a first number of transmitting elements aligned along a first line, wherein each of the transmitting elements is separated by a predetermined distance along the first line;
      a second number of receiving elements aligned along a second line, wherein the first number is equal to the second number, wherein each of the receiving elements is separated by the predetermined distance along the second line, and wherein the first line is perpendicular to the second line; and
   a control system having at least one computer processor, wherein the control system is in communication with the at least one propulsion motor and each of the acoustic elements, and
   wherein the control system is configured to execute a method comprising:
      selecting a first angle for transmitting an acoustic signal by each of the first number of transmitting elements;
      selecting, for each of the transmitting elements, a time for transmitting the acoustic signal, wherein each of the times is selected based at least in part on the predetermined distance, the first angle and a speed of sound;
      transmitting the acoustic signal by each of the transmitting elements, wherein each of the transmitting elements transmits the acoustic signal at the time selected for that transmitting element;
      receiving, by each of the receiving elements, reflections of acoustic energy from at least one object;
      determining a second angle to the at least one object based at least in part on the reflections of the acoustic energy; and
      determining a position of the at least one object based at least in part on the first angle and the second angle.

2. The aerial vehicle of claim 1, wherein determining the second angle comprises:
   identifying an angular range of operation for the second number of receiving elements, wherein the angular range comprises a predetermined number of angular intervals;
   sampling each of the predetermined number of angular intervals, wherein sampling each of the predetermined number of angular intervals comprises:
      calculating, for each of the predetermined number of angular intervals, a delay time based at least in part on the predetermined distance and the speed of sound;
      adjusting, for each of the predetermined number of angular intervals, data corresponding to energy captured by each of the receiving elements by a multiple of the delay time, wherein the multiple ranges from zero to the predetermined number of the angular intervals; and
      calculating, for each of the predetermined number of angular intervals, a delayed sum of the data corresponding to the energy captured by each of the receiving elements; and
   determining that the delayed sum calculated for one of the angular intervals exceeds a predetermined threshold, wherein the second angle corresponds to the one of the angular intervals.

3. The aerial vehicle of claim 1, wherein a delay time is calculated by dividing a product of the predetermined distance and a sine of the first angle by the speed of sound, and
   wherein each of the times for transmitting the acoustic signal is separated by one of the delay time.

4. The aerial vehicle of claim 1, wherein each of the first number and the second number is an integer not less than three,
   wherein the first number of transmitting elements is mounted to an underside of the aerial vehicle along the first line, and
   wherein the second number of receiving elements is mounted to the underside of the aerial vehicle along the second line.

5. A method comprising:
   transmitting first energy at a first angle by at least a first transmitter at a first time, wherein the first transmitter is one of a plurality of transmitting elements mounted to a frame of an aerial vehicle and aligned along a first line, and wherein each of the transmitting elements is separated by a predetermined distance along the first line;
   selecting a second time for transmitting second energy at the first angle by a second transmitter, wherein the second transmitter is one of the plurality of transmitting elements, wherein the first transmitter and the second transmitter are separated by a first distance along the first line, wherein the second time is selected based at least in part on the first angle, the first distance and a speed of the first energy and the second energy in a medium in which the first transmitter and the second transmitter are provided, and wherein the first angle is defined with respect to the first line;

transmitting the second energy at the first angle by the second transmitter at the second time;

capturing third energy by a first receiver, wherein the first receiver is one of a plurality of receiving elements mounted to the frame and aligned along a second line, wherein each of the plurality of receiving elements is separated by a predetermined distance along the second line, wherein the second line is perpendicular to the first line, and wherein the third energy comprises a reflection of at least some of the first energy or the second energy from at least one object;

capturing fourth energy by a second receiver, wherein the second receiver is one of the plurality of receiving elements, wherein the first receiver and the second receiver are separated by a second distance along the second line, and wherein the fourth energy is a reflection of at least some of the first energy or the second energy from the at least one object;

determining a second angle with respect to the second line based at least in part on the second distance, the third energy and the fourth energy; and determining at least a direction to the at least one object based at least in part on the first angle and the second angle.

6. The method of claim 5, wherein selecting the second time for transmitting the second energy at the first angle by the second transmitter comprises:

calculating a delay time by dividing a product of the first distance and a sine of the first angle by a speed of the first energy or the second energy, wherein the second time follows the first time by the delay time.

7. The method of claim 5, wherein determining the second angle with respect to the second line comprises:

identifying an angular range of operation for at least one of the first receiver and the second receiver, wherein the angular range comprises a predetermined number of angular intervals;

calculating, for each of the angular intervals, a delay time based at least in part on the second distance and a speed of at least one of the first energy or the second energy;

calculating, for each of the angular intervals, a delayed sum of first data regarding the third energy and second data regarding the fourth energy based at least in part on the delay time for one of the angular intervals; and determining, based at least in part on the delayed sums calculated for each of the angular intervals, that a delayed sum calculated for one of the angular intervals exceeds a predetermined threshold, wherein the second angle corresponds to the one of the angular intervals.

8. The method of claim 7, wherein each of the delay times is calculated by dividing a product of the second distance and a sine of one of the angular intervals by the speed of the at least one of the first energy or the second energy.

9. The method of claim 5, comprising:

identifying an angular range for at least one of the first transmitter or the second transmitter;

selecting a plurality of angles within the angular range, wherein the first angle is one of the plurality of angles;

calculating, for each of the plurality of angles, a delay time between a transmission of energy by the first transmitter and a transmission of energy by the second transmitter; and selecting, for each of the plurality of angles, times for transmitting energy at each of the plurality of angles by each of the first transmitter and the second transmitter based at least in part on the delay times calculated for each of the plurality of angles, wherein each of the times for transmitting energy at one of the plurality of angles by the first transmitter and the second transmitter is separated by the delay time calculated for the one of the plurality of angles, and wherein the first time and the second time are separated by the delay time calculated for the first angle.

10. The method of claim 9, wherein each of the delay times is calculated by dividing a product of the first distance and a sine of one of the plurality of angles by the speed of the first energy and the second energy in the medium.

11. The method of claim 5, wherein the third energy is captured by the first receiver at a third time, and wherein the method further comprises:

determining a position of the at least one object based at least in part on the direction to the at least one object and a difference between the first time and the third time.

12. The method of claim 11, further comprising:

generating a representation of a scene based at least in part on the position of the at least one object.

13. The method of claim 5, wherein the first energy and the second energy are acoustic energy, and wherein the speed of the first energy and the second energy is a speed of sound in the medium.

14. The method of claim 6, wherein the first energy and the second energy are electromagnetic energy, and wherein the speed of the first energy and the second energy is a speed of light in the medium.

15. The method of claim 5, comprising:

selecting a fifth time for transmitting third energy at the first angle by a third transmitter, wherein the third transmitter is one of the plurality of transmitting elements, wherein the second transmitter and the third transmitter are separated by a second distance along the first line, and wherein the fifth time is selected based at least in part on the first angle and the second distance;

transmitting the third energy at the first angle by the third transmitter at the third time; and receiving third data by a third receiver, wherein the third data comprises a reflection of at least some of the first energy, the second energy or the third energy from the at least one object, and wherein a peak intensity of the third data is observed at a sixth time, and wherein determining the second angle with respect to the second line comprises:

determining the second angle with respect to the second line based at least in part on the second distance, the third distance, the third time, the fourth time and the sixth time.

16. The method of claim 5, wherein each of the first transmitter, the second transmitter, the first receiver and the second receiver is mounted to a vehicle, wherein each of the first transmitter and the second transmitter is configured to transmit energy forward of or below the vehicle, and wherein each of the first receiver and the second receiver is configured to receive energy forward of or below the vehicle.

17. An aerial vehicle comprising:

a frame;

a first array of elements mounted to the frame, wherein each of the first array of elements is configured to transmit energy at one or more of a plurality of angles, wherein each of the first array of elements is mounted to the frame along a first line, and wherein each of the first array of elements is separated by a first distance along the first line;

a second array of elements mounted to the frame, wherein each of the second array of elements is configured to receive data regarding the energy, wherein each of the second array of elements is mounted to the frame along a second line, wherein a number of elements of the second array is equal to a number of elements of the first array, wherein each of the second array of elements is separated by a second distance along the second line, and wherein the second line is perpendicular to the first line; and a control system comprising at least one computer processor, wherein the control system is in communication with each of the elements of the first array and each of the elements of the second array, and wherein the control system is programmed with instructions for executing a method comprising:

selecting at least a first angle, wherein the first angle is one of the plurality of angles;

calculating a delay time, wherein the delay time is calculated by dividing a product of the first distance and a sine of the first angle by a speed of the energy;

assigning one transmission time to each of the first array of elements, wherein transmission times of adjacent elements of the first array are separated by the delay time; and transmitting, by each of the first array of elements, a selected pulse of energy at the first angle at the transmission time assigned to the element.

18. An aerial vehicle comprising:

a frame;

a first array of elements mounted to the frame, wherein each of the first array of elements is configured to transmit energy at one or more of a plurality of angles, wherein each of the first array of elements is mounted to the frame along a first line, and wherein each of the first array of elements is separated by a first distance along the first line;

a second array of elements mounted to the frame, wherein each of the second array of elements is configured to receive data regarding the energy, wherein each of the second array of elements is mounted to the frame along a second line, wherein a number of elements of the second array is equal to a number of elements of the first array, wherein each of the second array of elements is separated by a second distance along the second line, and wherein the second line is perpendicular to the first line; and a control system comprising at least one computer processor, wherein the control system is in communication with each of the elements of the first array and each of the elements of the second array, and wherein the control system is programmed with instructions for executing a method comprising:

capturing, by each of the second array of elements, data regarding energy reflected from at least one object;

determining an angular range of the second array of elements;

selecting a plurality of angles within the angular range;

calculating, for each of the plurality of angles, a delay time by dividing a product of the second distance and a sine of one of the angles by a speed of the energy;

adjusting, for each of the plurality of angles, at least some of the data captured by each of the second array of elements by a multiple of the delay time;

calculating, for each of the plurality of angles, a delayed sum of the at least some of the adjusted data;

determining that at least one of the delayed sums exceeds a predetermined threshold; and determining an angle to the at least one object based at least in part on the at least one of the delayed sums.

19. The aerial vehicle of claim 17, wherein each of the elements of the first array is configured to transmit one of acoustic energy or electromagnetic energy, and wherein each of the elements of the second array is configured to receive the one of acoustic energy or electromagnetic energy.

20. The aerial vehicle of claim 18, wherein each of the elements of the first array is configured to transmit one of acoustic energy or electromagnetic energy, and wherein each of the elements of the second array is configured to receive data regarding the one of acoustic energy or electromagnetic energy.

\* \* \* \* \*